(12) United States Patent　　(10) Patent No.:　US 12,698,445 B2

Tharpe, Jr.　　(45) **Date of Patent:　*Aug. 4, 2026**

(54) ORTHOGONAL PYROLYSIS SYSTEM AND ASSOCIATED METHODS

(71) Applicant: American Bio-Energy Converting Corp., Albany, GA (US)

(72) Inventor: Johnny Marion Tharpe, Jr., Albany, GA (US)

(73) Assignee: American Bio-Energy Converting Corp., Albany, GA (US)

( * ) Notice: Subject to any disclaimer, the term of this patent is extended or adjusted under 35 U.S.C. 154(b) by 223 days.

This patent is subject to a terminal disclaimer.

(21) Appl. No.: 18/637,505

(22) Filed: Apr. 17, 2024

(65) Prior Publication Data

US 2024/0301293 A1　　Sep. 12, 2024

Related U.S. Application Data

(63) Continuation-in-part of application No. 18/591,038, filed on Feb. 29, 2024.

(Continued)

(51) Int. Cl.

| | |
|---|---|
| *C10B 53/02* | (2006.01) |
| *C01B 3/24* | (2006.01) |
| *C10B 19/00* | (2006.01) |
| *C10B 47/44* | (2006.01) |
| *C10B 49/04* | (2006.01) |

(52) U.S. Cl.

CPC ................ *C10B 53/02* (2013.01); *C01B 3/24* (2013.01); *C10B 19/00* (2013.01); *C10B 47/44*

(2013.01); *C10B 49/04* (2013.01); *C01B 2203/06* (2013.01); *C01B 2203/0838* (2013.01);

(Continued)

(58) Field of Classification Search

CPC ......... C10B 19/00; C10B 47/44; C10B 49/04; C10B 53/02; C01B 3/24

See application file for complete search history.

(56) References Cited

U.S. PATENT DOCUMENTS 3,335,461 A　　8/1967　Schwartz
3,776,150 A　*　12/1973　Evans ..................... C10B 53/00
110/346

(Continued)

FOREIGN PATENT DOCUMENTS

EP　　　3048161 A1　　7/2016

*Primary Examiner* — Jonathan Miller

(74) *Attorney, Agent, or Firm* — ALLEN, DYER, DOPPELT + GILCHRIST, P.A.

(57) ABSTRACT

A pyrolysis system for biomass includes a pyrolysis chamber having a chamber inlet end and chamber outlet end and an outer pyrolysis chamber having inner and outer chamber walls formed generally concentric to each other defining an outer passage extending between the chamber inlet end and chamber outlet end. An inner pyrolysis chamber has an inner passage extending between the chamber inlet and outlet ends. Outer and inner heating elements are arranged at the outer and inner chamber walls, respectively. A pyrolysis auger advances pyrolyzing biomass from the chamber inlet end to the chamber outlet end. The inner pyrolysis chamber, inner heating elements, pyrolysis auger, outer pyrolysis chamber and outer heating elements are generally concentric. A biomass feed extruder advances biomass orthogonally into the pyrolysis chamber.

20 Claims, 19 Drawing Sheets

Related U.S. Application Data

(60) Provisional application No. 63/450,792, filed on Mar. 8, 2023.

(52) U.S. Cl.
CPC *C01B 2203/085* (2013.01); *C01B 2203/0866* (2013.01); *C01B 2203/1241* (2013.01)

(56) References Cited

U.S. PATENT DOCUMENTS

| | | | |
|---|---|---|---|
| 4,217,175 A | 8/1980 | Reilly | |
| 4,308,103 A | 12/1981 | Rotter | |
| 4,849,057 A | 7/1989 | Steinstrasser et al. | |
| 5,220,873 A | 6/1993 | Milsap, III | |
| 7,931,783 B2 | 4/2011 | Dam-Johansen et al. | |
| 8,206,471 B1 | 6/2012 | Tharpe, Jr. | |
| 8,353,973 B2 | 1/2013 | Tharpe, Jr. | |
| 9,068,121 B1 | 6/2015 | Tharpe, Jr. | |
| 9,447,325 B1 | 9/2016 | Tharpe, Jr. | |
| 9,464,234 B1 | 10/2016 | Tharpe, Jr. | |
| 9,605,210 B2 | 3/2017 | Tucker et al. | |
| 9,663,733 B2 | 5/2017 | Hornung et al. | |
| 9,719,020 B1 | 8/2017 | Tharpe, Jr. | |
| 9,994,784 B2 | 6/2018 | Chataing | |
| 10,421,911 B2 | 9/2019 | Ullom | |
| 10,696,904 B2 * | 6/2020 | Stanley | C10B 47/44 |
| 11,242,495 B1 | 2/2022 | Tharpe, Jr. | |
| 11,542,435 B2 * | 1/2023 | Neville | C10B 57/14 |
| 2004/0079262 A1 | 4/2004 | Hornung et al. | |
| 2008/0006519 A1 | 1/2008 | Badger | |
| 2008/0006520 A1 * | 1/2008 | Badger | C10B 51/00 |
| | | | 202/202 |
| 2008/0128259 A1 | 6/2008 | Kostek et al. | |
| 2008/0202983 A1 * | 8/2008 | Smith | C10B 53/07 |
| | | | 422/198 |
| 2009/0007484 A1 | 1/2009 | Smith | |
| 2009/0282738 A1 | 11/2009 | Tharpe, Jr. | |
| 2011/0067991 A1 | 3/2011 | Hornung et al. | |
| 2016/0024390 A1 | 1/2016 | Ullom | |
| 2024/0301292 A1 * | 9/2024 | Tharpe, Jr. | C10B 53/02 |

* cited by examiner

PV TO HGF

GAS FEED
SYSTEM

ORTHOGONAL PYROLYSIS SYSTEM AND ASSOCIATED METHODS

PRIORITY APPLICATION(S)

This is a continuation-in-part application which claims priority to U.S. patent application Ser. No. 18/591,038 filed Feb. 29, 2024, which claims priority to U.S. Provisional Application No. 63/450,792 filed Mar. 8, 2023, the disclosures which are hereby incorporated by reference in their entirety.

FIELD OF THE INVENTION

The present invention relates to pyrolysis, and more particularly, to systems and methods for the pyrolysis of biomass.

BACKGROUND OF THE INVENTION

The need to both find alternative energy sources, particularly those which reduce excess carbon dioxide release, and decrease waste in various industrial and commercial processes is well recognized. One process that helps achieve all of these objectives is the pyrolysis of biomass. Biomass, or the fuel products derived from it, can be burned to produce power. Unlike fossil fuels, however, carbon dioxide released from the burning of biomass does not contribute to the overall carbon dioxide content of the atmosphere. This is true because biomass is part of the world's atmospheric carbon cycle. For this reason, biomass is viewed as a renewable, carbon-neutral fuel. As examples, processing facilities for forest products, used automotive tires and used railroad cross ties and municipal yard waste collection are substantial sources of biomass.

The fast pyrolysis of biomass utilizes high temperatures (typically in excess of 450 degrees Celsius) to rapidly heat biomass in the absence of oxygen. The end products of pyrolysis are pyrolysis oil (or bio-oil), char and non-condensing gases, all of which are combustible to some degree. While there are various ways to improve the overall efficiency of the pyrolysis process, one key element is improving the heat transfer to the particulate biomass feedstock.

SUMMARY OF THE INVENTION

A pyrolysis system for biomass may comprise a pyrolysis chamber having a chamber inlet end and chamber outlet end. The pyrolysis chamber may comprise an outer pyrolysis chamber having inner and outer chamber walls formed generally concentric to each other defining an outer passage extending between the chamber inlet end and chamber outlet end along a chamber axis, and an inner pyrolysis chamber having an inner passage radially inward of the inner chamber wall and extending between the chamber inlet and outlet ends along the chamber axis. A plurality of outer heating elements may be arranged at the outer chamber wall, and a plurality of inner heating elements may be arranged at the inner chamber wall. A pyrolysis auger may be operable to advance pyrolyzing biomass within the outer pyrolysis chamber from the chamber inlet end to the chamber outlet end.

The inner pyrolysis chamber, inner heating elements, pyrolysis auger, outer pyrolysis chamber and outer heating elements are generally concentric. A biomass feed extruder may comprise an auger housing having a housing inlet that receives biomass and a distal end connected to the chamber inlet end, and a biomass feed auger arranged therein and configured to receive biomass at the housing inlet and advance the biomass from the housing inlet through the auger housing generally orthogonally into the outer pyrolysis chamber.

In one aspect, the biomass feed extruder and outer pyrolysis chamber may be configured to create a change in biomass flow of about ninety degrees from the biomass feed extruder into the outer pyrolysis chamber. The biomass feed extruder and outer pyrolysis chamber may be configured to create a shearing effect on the biomass as it enters the outer pyrolysis chamber from the biomass feed extruder. The biomass feed extruder may include a ram drive operable to translate the biomass feed auger back and forth to compact the biomass fed into the outer pyrolysis chamber.

A gas feed system may be operable to supply a controllable flow of gas to the inner pyrolysis chamber at the chamber inlet end. The plurality of outer and inner heating elements may be arranged in heating element passages formed within the outer and inner chamber walls respectively. The inner heating elements may be configured to heat the pyrolysis auger to a temperature from 350 degrees Celsius to 700 degrees Celsius and above. The outer heating elements may be configured to heat the outer pyrolysis chamber from 350 degrees Celsius to 700 degrees Celsius and above. The inner and outer heating elements each comprise electrical resistance heating elements. The inner and outer heating elements may each comprise an active region. An inner auger may be arranged within the inner pyrolysis chamber and operable to remove deposits therefrom. The outer passage may define generally a toroidal passage.

A method of operating a pyrolysis system for biomass is disclosed. The system may include a pyrolysis chamber having a chamber inlet end and chamber outlet end. The pyrolysis chamber may comprise an outer pyrolysis chamber having inner and outer chamber walls formed generally concentric to each other defining an outer passage extending between the chamber inlet end and chamber outlet end along a chamber axis. An inner pyrolysis chamber may have an inner passage radially inward of the inner chamber wall and extending between the chamber inlet end and chamber outlet end along the chamber axis. A plurality of outer heating elements may be arranged at the outer chamber wall, a plurality of inner heating elements arranged at the inner chamber wall, and a pyrolysis auger operable to advance pyrolyzing biomass within the outer pyrolysis chamber from the chamber inlet to the outlet. The inner pyrolysis chamber, inner heating elements, pyrolysis auger, outer pyrolysis chamber and outer heating elements are generally concentric. The method may comprise receiving biomass within a biomass feed extruder that includes an auger housing having a biomass feed auger and a housing inlet that receives the biomass and a distal end connected to the chamber inlet end, and advancing the biomass from the housing inlet through the auger housing generally orthogonally into the outer passage of the outer pyrolysis chamber.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Figure 1:
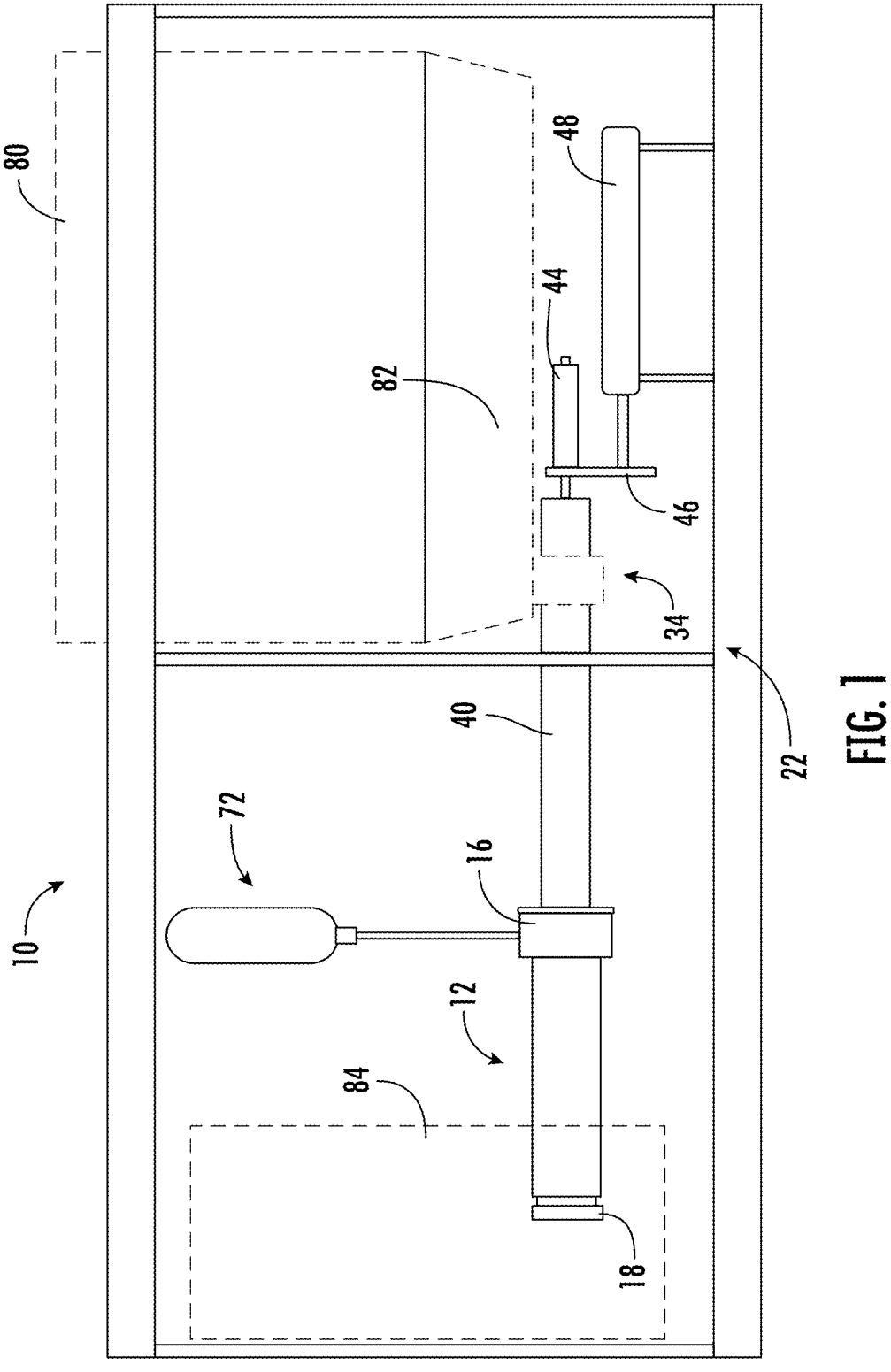
FIG. 1 is a schematic overview of a pyrolysis chamber arrangement including a pyrolysis chamber, a solid feed system, inner and outer heating elements and a gas feed system, according to an embodiment of the present invention.
Figure 2:
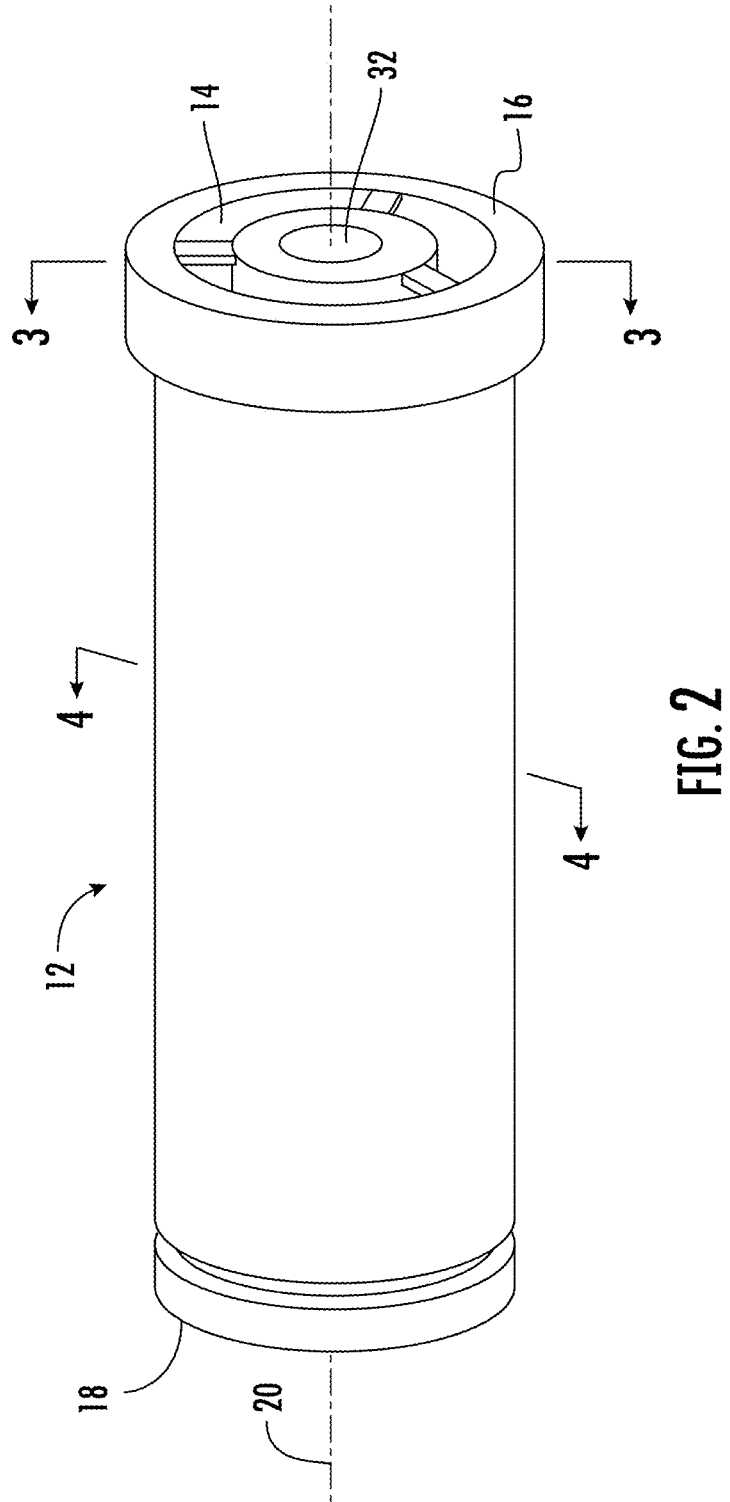
FIG. 2 is a perspective view of a pyrolysis chamber of the arrangement of FIG. 1.
Figure 3:
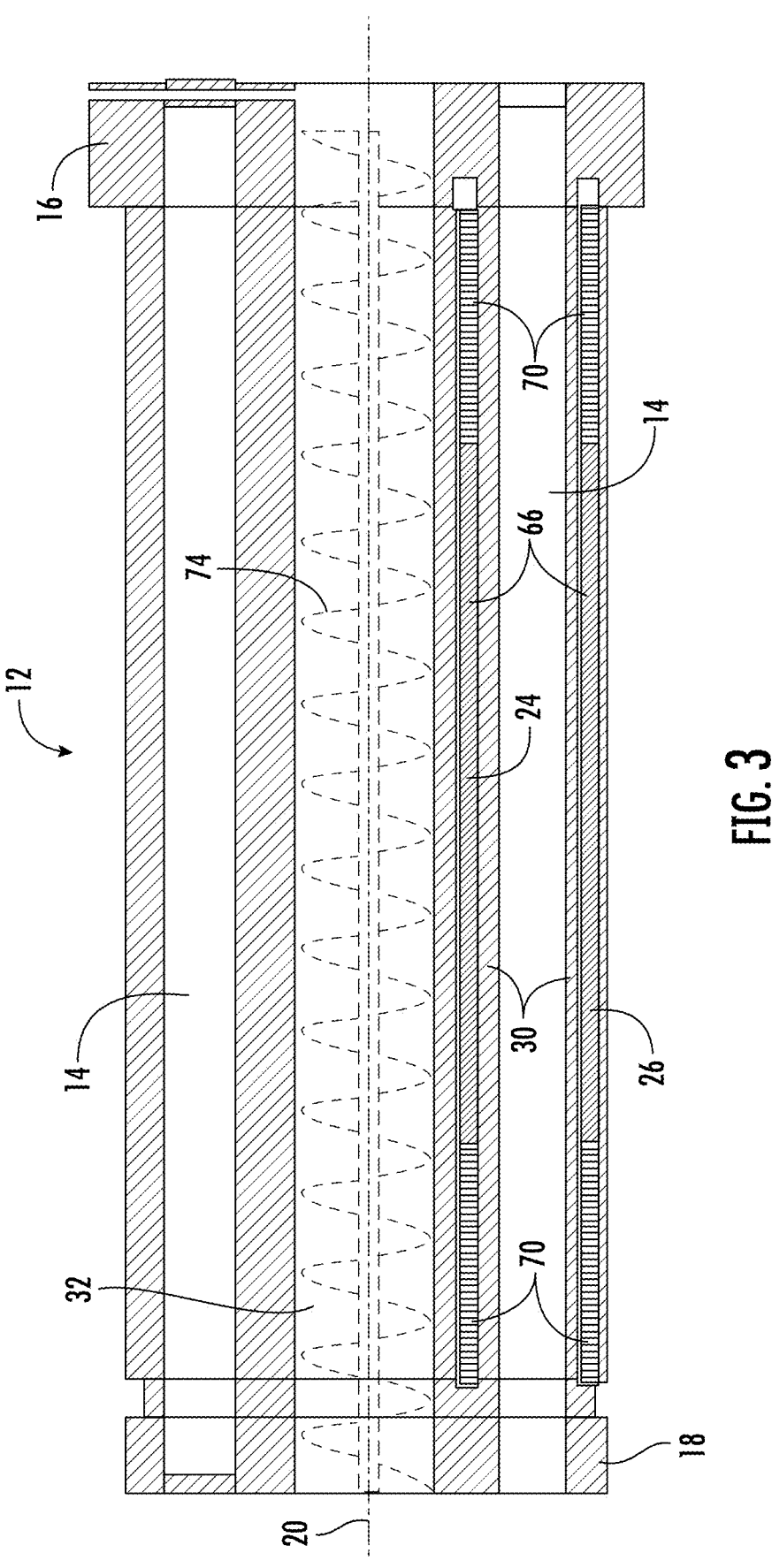
FIG. 3 is sectional view of the pyrolysis chamber taken along line 3-3 of FIG. 2.
Figure 4:
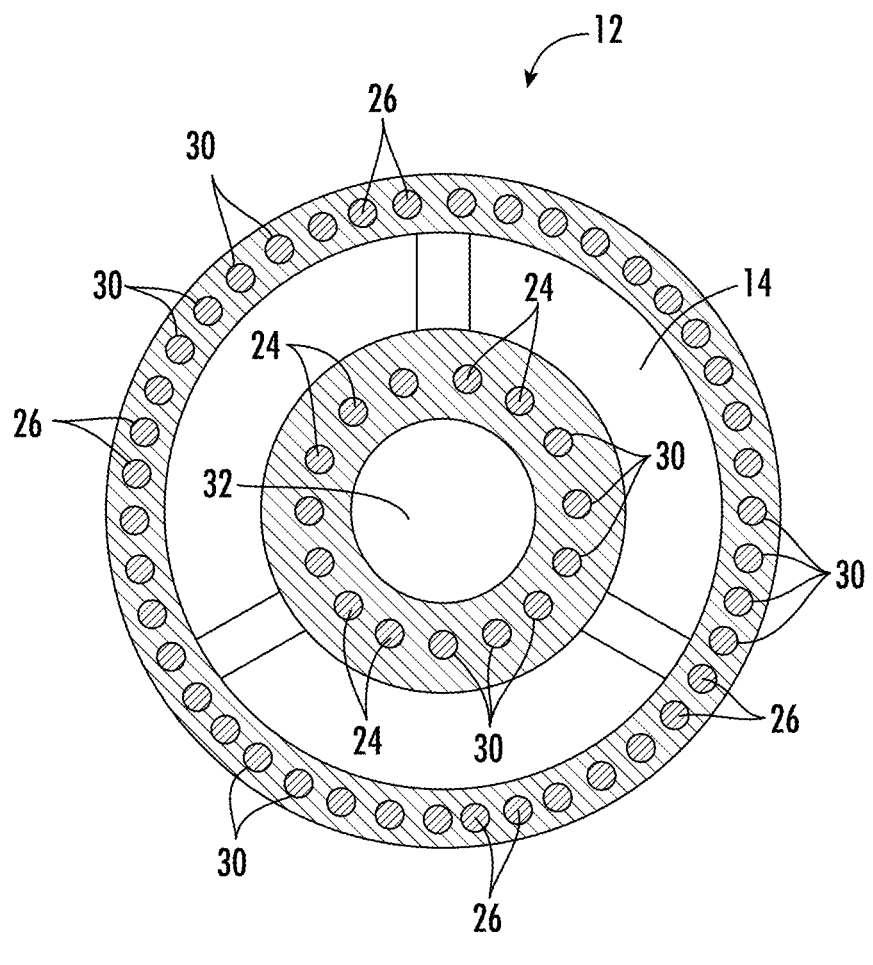
FIG. 4 is another sectional view of the pyrolysis chamber taken along line 4-4 of FIG. 2.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

According to an embodiment of the present invention, referring to FIGS. 1-4, a pyrolysis chamber arrangement 10 includes a pyrolysis chamber 12 defining a toroidal passage 14 extending between chamber inlet and outlet ends 16,18 along a chamber axis 20. A solid feed system 22 is connected at the inlet end 16 and is configured to drive particulate feedstock into and through the toroidal passage 14. Inner and outer heating elements 24,26 extend between the inlet and outlet ends 16,18 outside the inner and outer diameters of the toroidal passage 14, respectively. Particulate feedstock is compacted into toroids within, and driven through, the passage 14 by the solid feed system. The feedstock toroids are pyrolyzed by thermal input from the inner and outer heating elements 24,26 as they move through the passage 14 toward the outlet end 18.

The pyrolysis chamber 12 can be formed of metal framing with ceramic or similar insulating elements. Advantageously, the pyrolysis chamber 12 can be formed as a unitary solid out of high temperature ceramic material within the toroidal passage 14 and heating element passages 30 formed integrally therein for closely accommodating the inner and outer heating elements 24,26. In one preferred embodiment, the ceramic chamber is molded around the heating elements 24,26, ensuring uniformly close engagement therewith.

It will be appreciated that the heating elements need not be embedded in passaged formed integrally into chamber walls. The heating elements could simply be mounted outside of inner and outer walls of the toroidal passage. Additionally, while the depicted toroidal passage is believed to represent a preferred embodiment, a "toroidal" passage as used herein does not necessarily require a passage that is concentric about the chamber axis, of uniform radial dimensions around the chamber axis, or circular. For the purposes of this application, a passage is "toroidal" if it has both internal and external walls from which heat can be supplied into the biomass passing therethrough.

Preferably, an inner passage 32 is also defined extending between the inlet and outlet ends 16,18 surrounded by the inner heating elements 24 and generally concentric with the toroidal passage 14 about the chamber axis 20. The inner passage 32 can advantageously be used to perform methane pyrolysis simultaneously with the pyrolysis of the compacted feedstock toroids, as will be explained in greater detail below.

Figure 5:
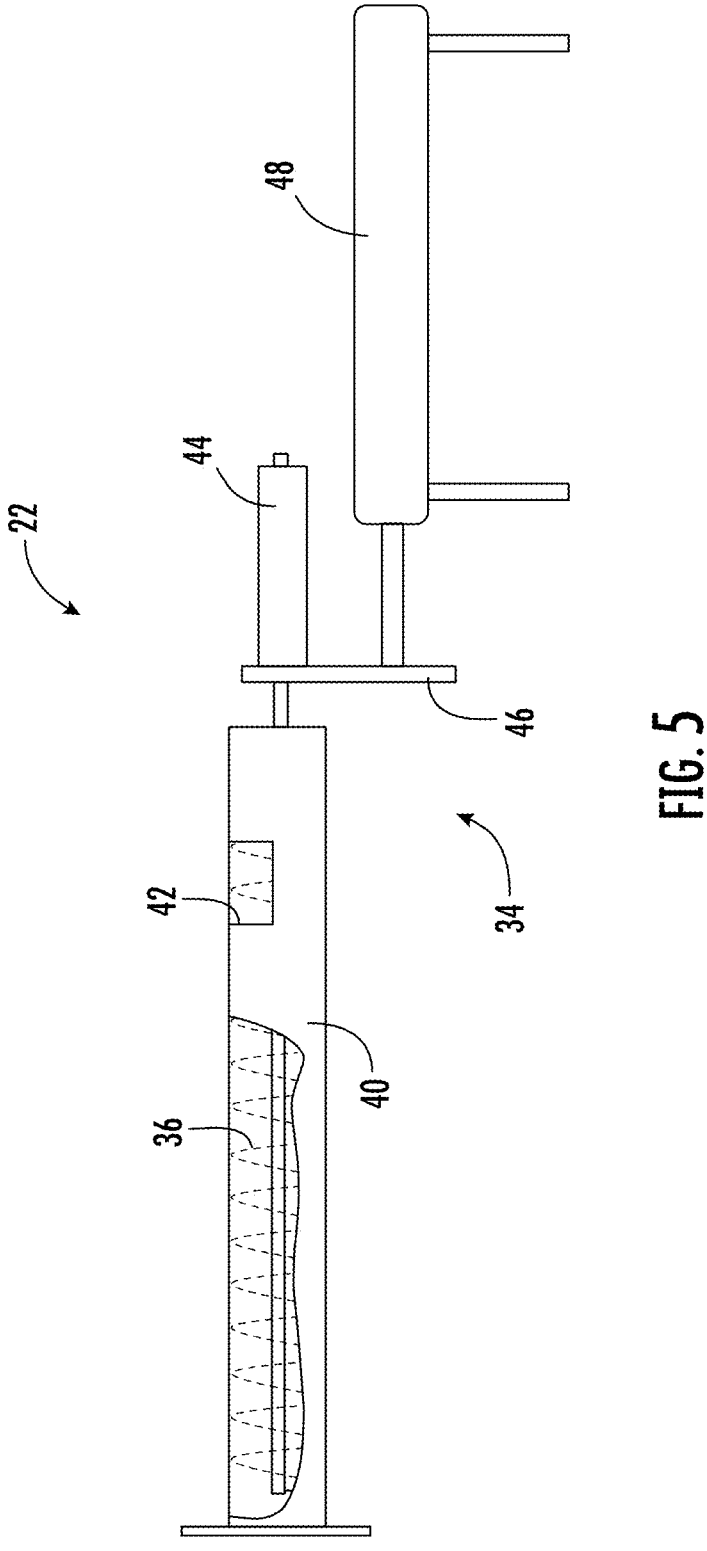
FIG. 5 is a partially cutaway side view of the solid feed system of the arrangement of FIG. 1.

Referring to FIG. 5, the solid feed system 22 includes a combination auger and ram assembly 34. The assembly 34 includes a screw-type auger 36 located within an auger housing 40 having an inlet 42 for receiving the particulate feedstock from a feed bin or the like. An auger motor 44 rotates the auger 36 about the chamber axis 20 to advance the feedstock to the inlet end 16 of the chamber 12 and into the toroidal passage 14. The auger 36 is mounted to an end plate 46 that is translatable along the chamber axis 20 via a ram drive 48.

Figure 6:
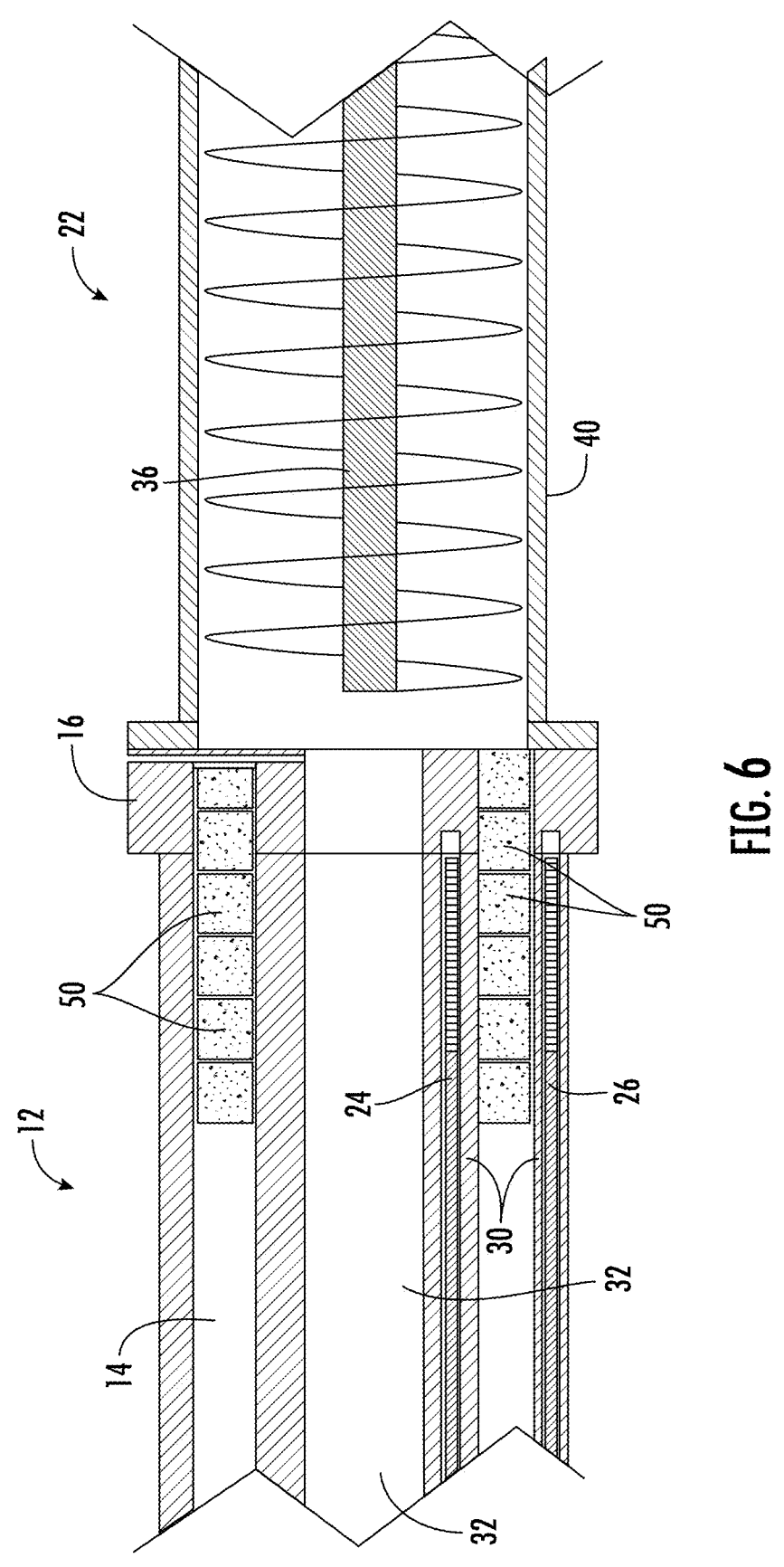
FIG. 6 is a sectional view of the pyrolysis chamber taken along line 3-3 of FIG. 2 also showing a portion of the solid feed system in the process of forming feedstock toroids.

Referring to FIG. 6, the linear action of the ram drive 48 functions to compact the particulate feedstock into a toroid 50 at the inlet end 16. As subsequent feedstock is fed and compacted behind previously formed toroid 50, the toroid 50 is advanced through the toroidal passage 14 along the chamber axis 20. Ultimately, a series of feedstock toroids 50 are advanced through the passage 14 in advancing states of pyrolysis as new toroids are formed therebehind.

The formation of these tightly compacted feedstock toroids 50 offers several significant advantages. For instance, because each toroid 50 is in contact with the inner and outer walls of the toroidal passage, each of which walls being in turn surrounded by respective heating elements 24,26, conduction of heat into, and quick distribution of heat within, each toroid 50 is greatly enhanced. In addition to a general improvement in energy efficiency, a desired degree of pyrolysis can be achieved within a shorter chamber length than in conventional pyrolysis chambers, resulting in a reduced equipment footprint. Furthermore, the toroids effectively form a barrier preventing backflow of hot pyrolysis gases into the solid feed system 22.

Figures 6A, 6B:
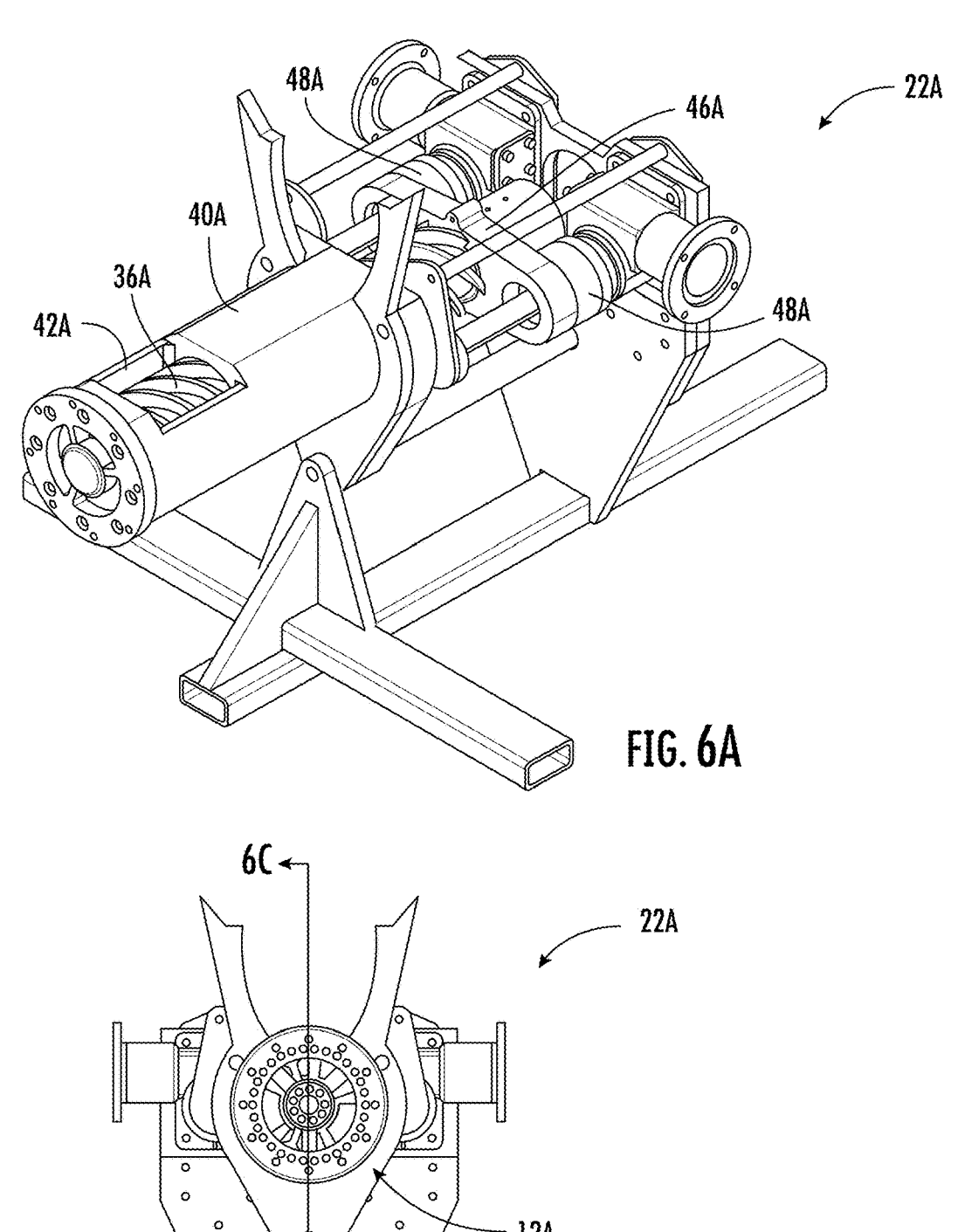
FIG. 6A is a perspective view of a solid feed system according to another embodiment of the present invention.
FIG. 6B is an end view of the solid feed system of FIG. 6A connected to a pyrolysis chamber.
Figure 6C:
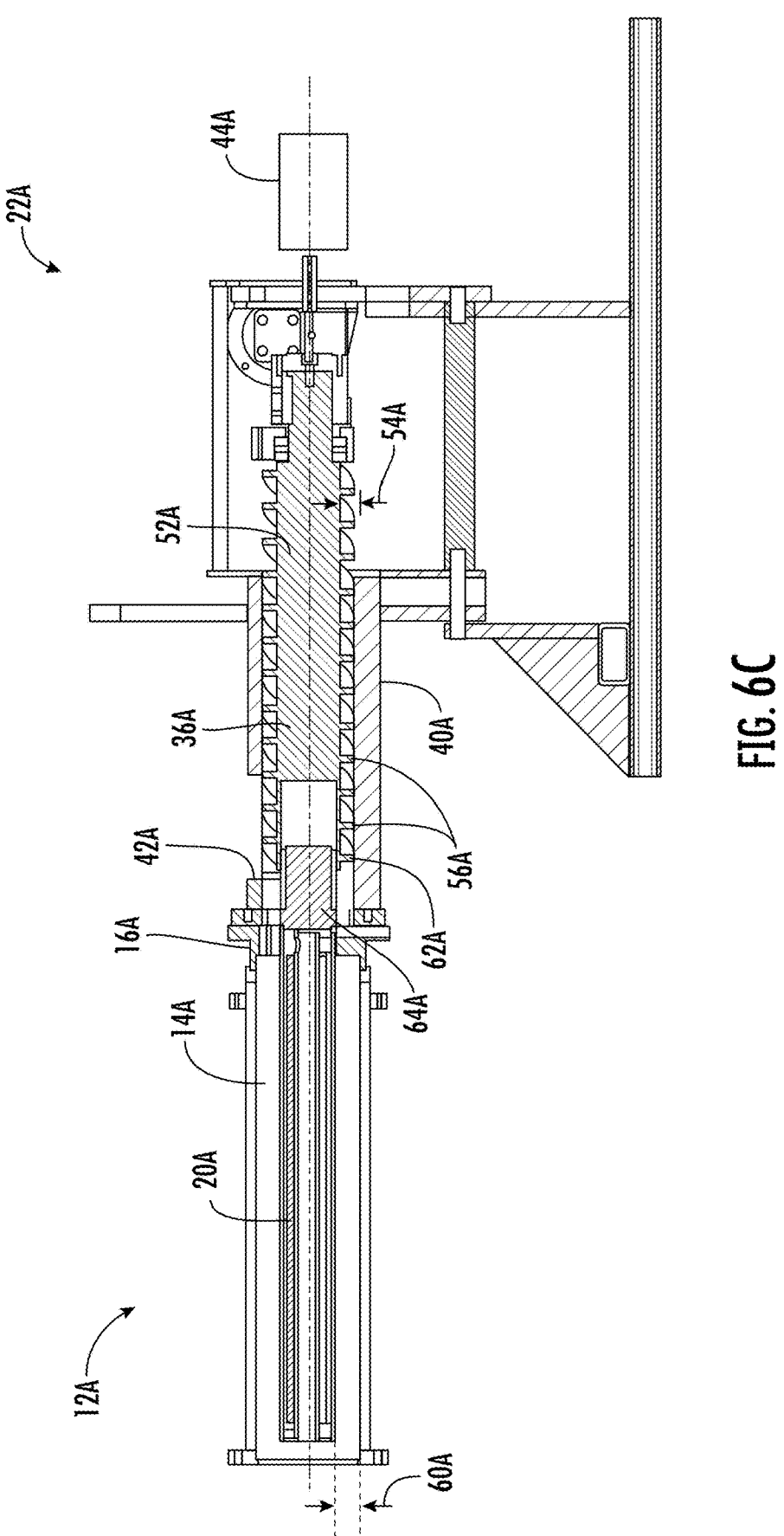
FIG. 6C is a sectional view taken along line 6C-6C of FIG. 6B.

Referring to FIGS. 6A-6C, according to an alternate embodiment of the solid feed system, a solid feed system 22A includes a modified screw-type auger 36A located within an auger housing 40A having an inlet 42A for receiving the particulate feedstock from a feed bin or the like. An auger motor 44A rotates the auger 36A about the chamber axis 20A to advance the feedstock to the inlet end 16A of the chamber 12A and into the toroidal passage 14A. The auger 36A is mounted to a drive plate 46A that is translatable along the chamber axis 20A via ram drives 48A.

A shaft 52A of the of the auger 36A has an increased diameter such that a radial dimension 54A of threads 56A of the auger 36A is slightly less than or equal to a radial dimension 60A of the toroidal passage 14A of the chamber 12A, facilitating transfer of the feedstock from the inlet 42A into the passage 14A at the inlet end 16A.

At a distal end 62A of the auger 36A adjacent the inlet end 16A of the chamber 12A, the shaft 52A of the auger 36A is hollow, allowing the distal end 62A to be rotatably supported by a hub 64A connected to the inlet end 16A while still allowing the translatable movement of the auger 36A along the chamber axis 20A. With the improved feedstock distribution afforded by the modified auger 36A, conditions for operation without use of the ram drive(s) 48A to form compacted feedstock toroids are more favorable.

The heating elements 24, 26 are preferably electrical resistance heating elements. The exterior periphery of the chamber 12 is preferably well insulated to minimize ambient heat loss from the outer heating elements 26, although the toroidal chamber 12 design tends to result in a significantly greater heat input into the toroidal passage 14 from each inner heating element 26. This allows fewer inner heating elements 24 to be used while still providing balanced heat input from both the inner and outer walls of the toroidal passage 14. For some applications, it may be desirable to adjust the thermal output of individual heating elements 24,26 and/or the total number of heating elements used.

It can be advantageous that the heating elements 24,26 do not provide thermal input adjacent to the inlet and outlet ends 16,18. Thus, each element 24,26 can (see FIG. 3) have a central active region 66 surrounded by terminal inactive regions 70. Generally, in one embodiment the central active region 66 is 26 inches and the terminal inactive regions 70 are each inches.

Figures 7A, 7B:
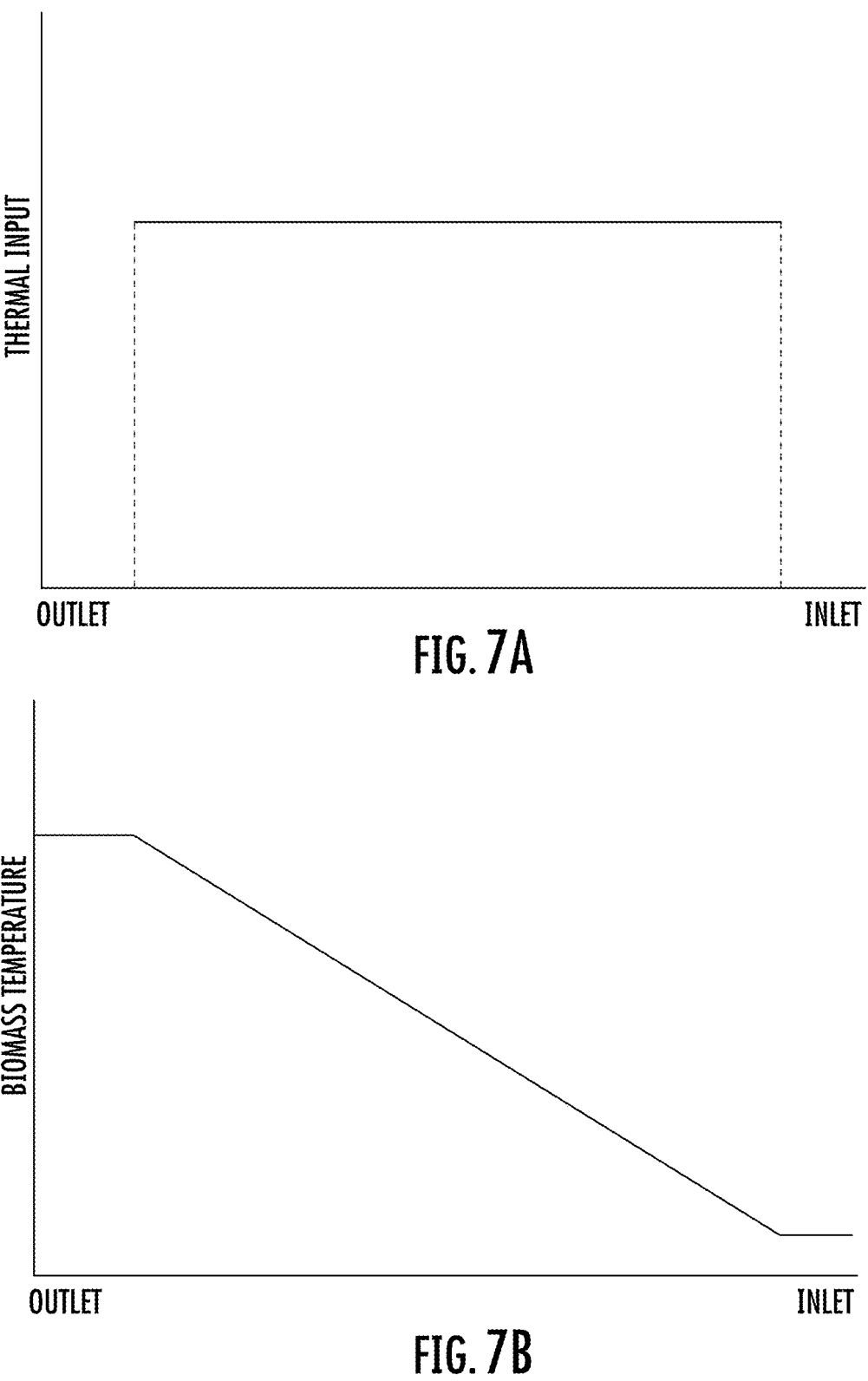
FIG. 7A is a thermal input profile along a chamber axis of the pyrolysis chamber of FIG. 2.
FIG. 7B is a temperature profile along the chamber axis of the pyrolysis chamber of FIG. 2.

In some embodiments, the active regions of all the heating elements 24,26 are coextensive (as in FIGS. 3 and 4), resulting in a generally constant thermal input into the toroidal passage 14 along the length of the active regions and a generally linear increase in temperature of the feedstock toroids 50 (see FIGS. 7A and 7B).

Figure 8:
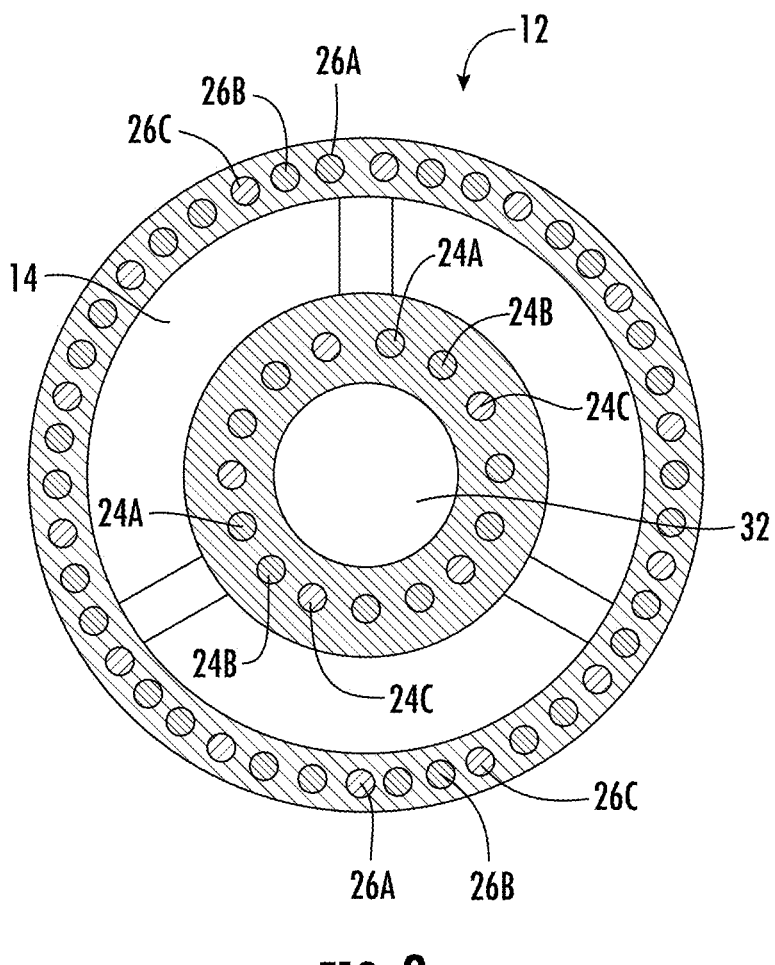
FIG. 8 is a sectional view of the pyrolysis chamber taken along line 4-4 of FIG. 2 according to an alternate embodiment of the present invention.
Figures 9A, 9B, 9C:
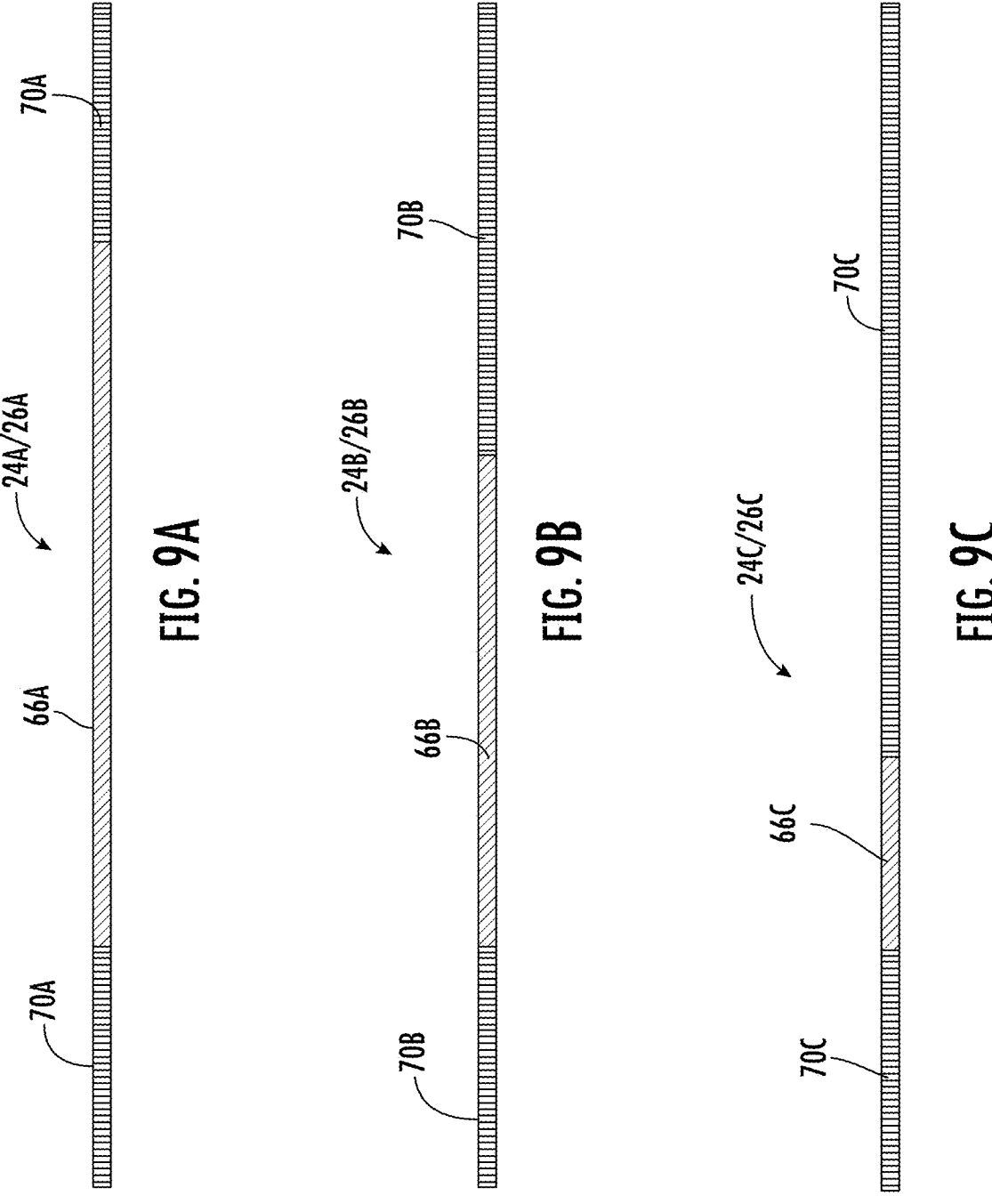
FIGS. 9A-C are side views of exemplary heating elements of the pyrolysis chamber of FIG. 8.

In other embodiments, the lengths of the active regions can be varied (see FIG. 8), resulting in a variable thermal input. In the FIG. 8 embodiment, only a first portion of the heating elements 24A, 26A have a longest active region 66A (see FIG. 9A), while a second portion 24B, 26B have an active region 66B that is approximately two-thirds the length of the active region 66A (see FIG. 9B), and a third portion 24C, 26C have an active region 66C approximately one-third the length of the active region 66A (see FIG. 9C). The heating elements 24A/B/C, 26A/B/C are arranged such that their respective active regions 66A/B/C all terminate at that same point proximate the outlet end 20, such that thermal input is only provided by the heating elements 24A initially, then by both the heating elements 24A, 24B, and finally be all the heating elements 24A/B/C.

Figure 10A:
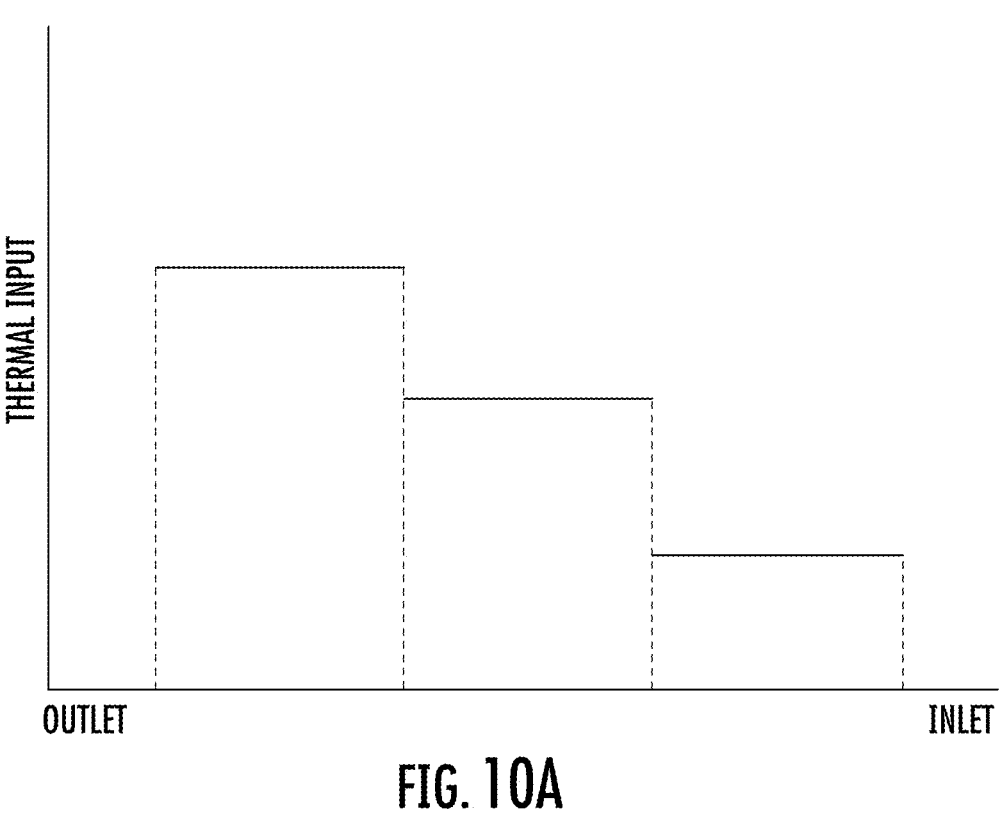
FIG. 10A is a thermal input profile along a chamber axis of the pyrolysis chamber of FIG. 8.
Figure 10B:
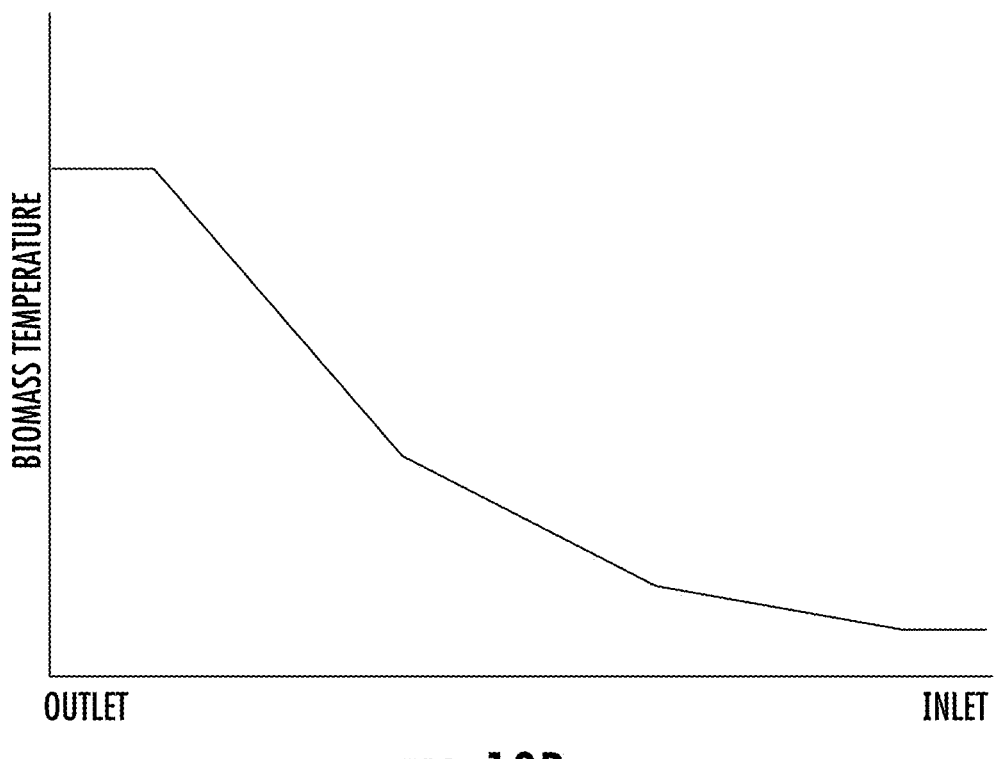
FIG. 10B is a temperature profile along the chamber axis of the pyrolysis chamber of FIG. 8.

This configuration of active regions 66A/B/C results in increases in thermal input along the length of the toroidal passage 14 and correspondingly incrementally ramped increases in temperature of the feedstock toroids (see FIGS. 10A and 10B). This thermal profile has been found advantageous for the formation of graphitic carbon suitable for graphene production in the solid material remaining in each toroid 50 after pyrolysis.

As mentioned above, the inner passage 32 can advantageously be used to perform methane pyrolysis simultaneously with the pyrolysis of the compacted feedstock toroids 50. For this purpose, referring again to FIG. 1, the chamber arrangement 10 can further include a gas feed system 72 operable to supply a controllable flow of gas, such as methane ($CH_4$), to the inner passage 32 (see FIGS. 2 and 3). The thermal input into the inner passage 32, primarily from the inner heating elements 24, will pyrolyze the methane into solid carbon (C) and hydrogen gas ($H_2$). The gas feed system 72 can be equipped with an inner auger 74 for clearing any carbon deposition from the inner passage 32. The gas feed system 72 could be used to supply other gases to the inner passage, including nitrogen or other inert gas.

As previously disclosed by this applicant (see U.S. Pat. No. 11,242,495, issued Feb. 8, 2022), pyrolysis oil can be made stably miscible with petroleum feedstock-derived oil without conventional upgrading or the addition of additional chemicals such as emulsifiers. In general terms, this is accomplished by mixing the pyrolysis vapor with the oil vapor and condensing the mixed vapors together. As the vapor formed by the biomass pyrolysis in the toroidal passage 14 and the $H_2$ gas generated by the methane pyrolysis in the inner passage 32 will mix together after leaving the outlet end 18 of the chamber, an equivalent miscible pyrolysis oil composition can be readily formed without any separate apparatus for vaporization of a petroleum feedstock-derived oil.

Figure 11:
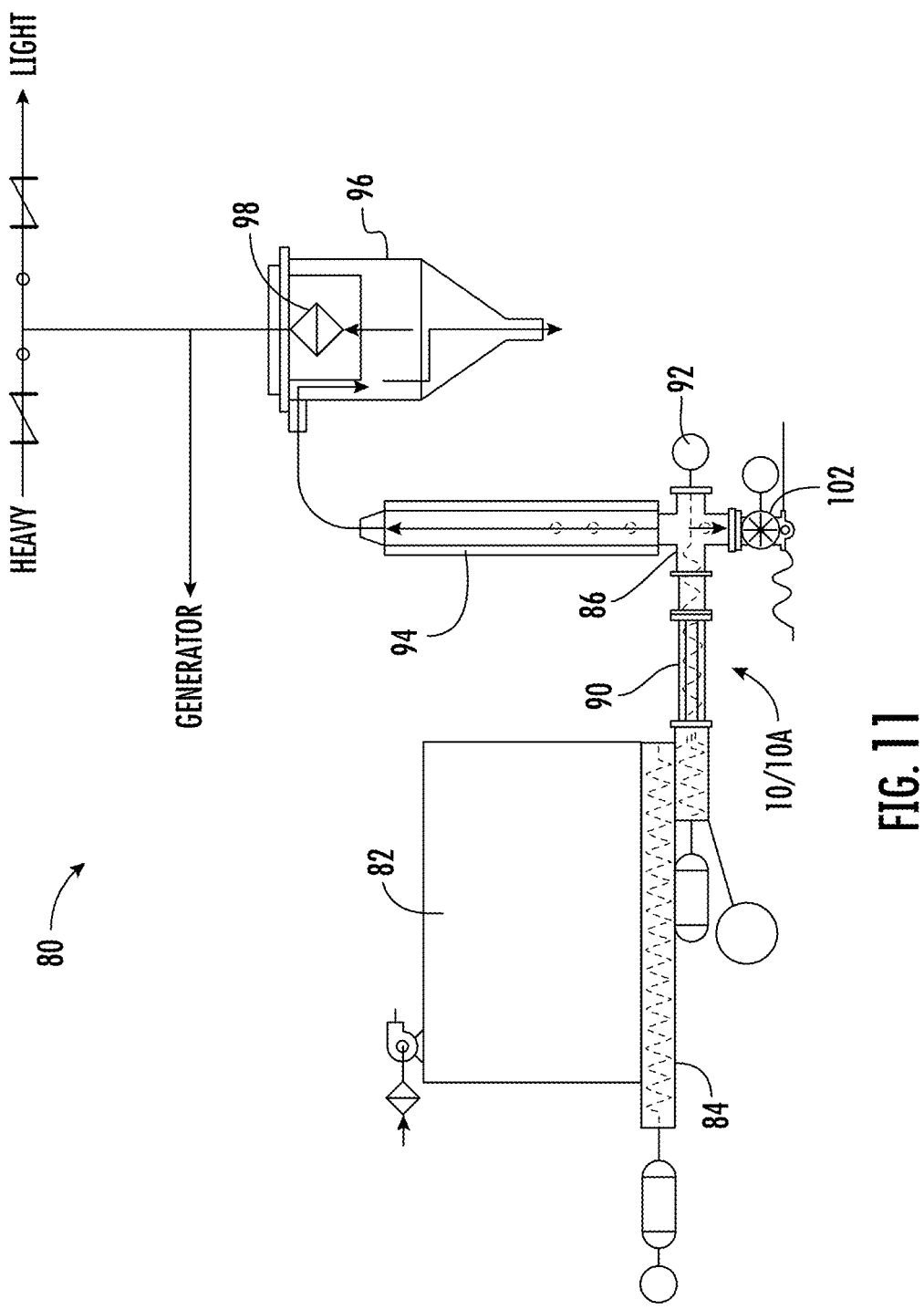
FIG. 11 is a schematic view of a pyrolysis system including the pyrolysis chamber arrangement of FIG. 1.

A pyrolysis chamber arrangement 10 (or 10A) according to the present invention can be readily integrated into a complete pyrolysis system 80. Referring to FIG. 11, particulate biomass is fed to the chamber arrangement 10/10A from a biomass bin 82 via a pre-feed auger 84. Carbon solids, pyrolysis vapor and non-condensable gases (NCGs) are all output from the pyrolysis chamber arrangement 10/10A into an output chamber 86. A toroidal auger 90, driven by a motor 92, advantageously extends into the toroidal passage 14/14A from the output chamber 86 and facilitates the removal of the carbon solids therefrom.

The pyrolysis vapor and NCGs travel through an insulated riser section 94 and pass through a carbon/gas separator 96 to remove any carbon that may remain entrained therewith, with the pyrolysis vapor and NCGs subsequently passing through a hot gas filter 98. The filtered pyrolysis vapor and NCGs can be used directly for power generation, or subjected to further processing, as will be described in greater detail below. Generally, subsequent processing of the pyrolysis vapor and NCGs will vary depending on whether the desired final product is light or heavy pyrolysis oil. As used herein, "light" pyrolysis oil has a lower density than water while "heavy" pyrolysis oil has a higher density than water.

Figure 12:
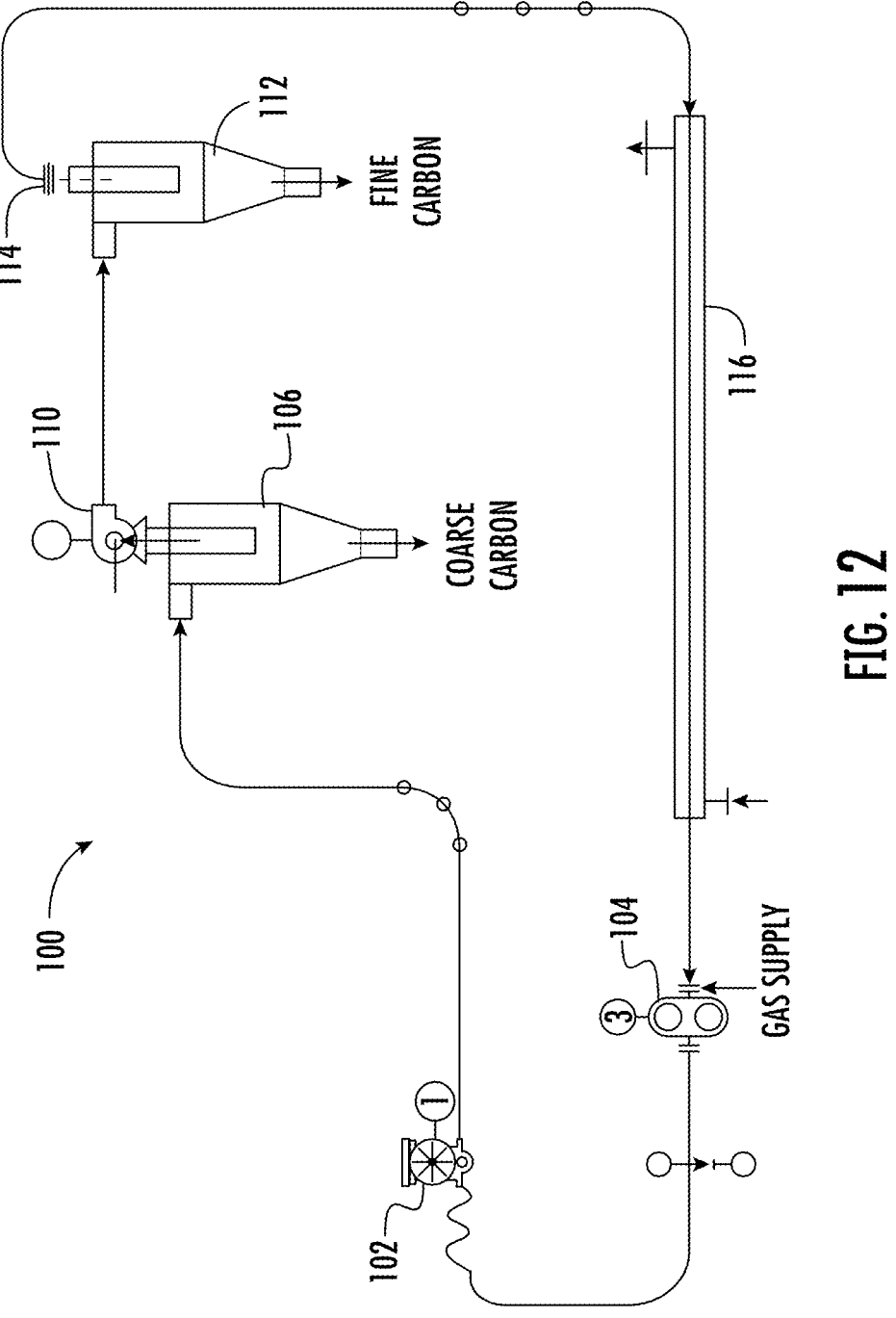
FIG. 12 is a schematic view of a carbon entrainment loop of the pyrolysis system of FIG. 11.

Non-entrained carbon in the output chamber 86 falls via gravity and is removed and introduced into a carbon entrainment loop 100 (see FIG. 12) by a blow-through rotary air valve 102. An entrainment blower 104 forces an inert entrainment gas (such as nitrogen) to entrain the carbon from the valve 102, which is then introduced into a first carbon cyclone 106, from which coarser carbon is removed.

Remaining fine carbon in the entrainment gas is introduced via entrainment fan 110 into a second carbon cyclone 112, from which fine carbon is removed. An output filter 114 removes remaining solids from the entrainment gas, which is then passed through an entrainment gas cooler 116 before recirculating back through the loop 100.

Figure 13:
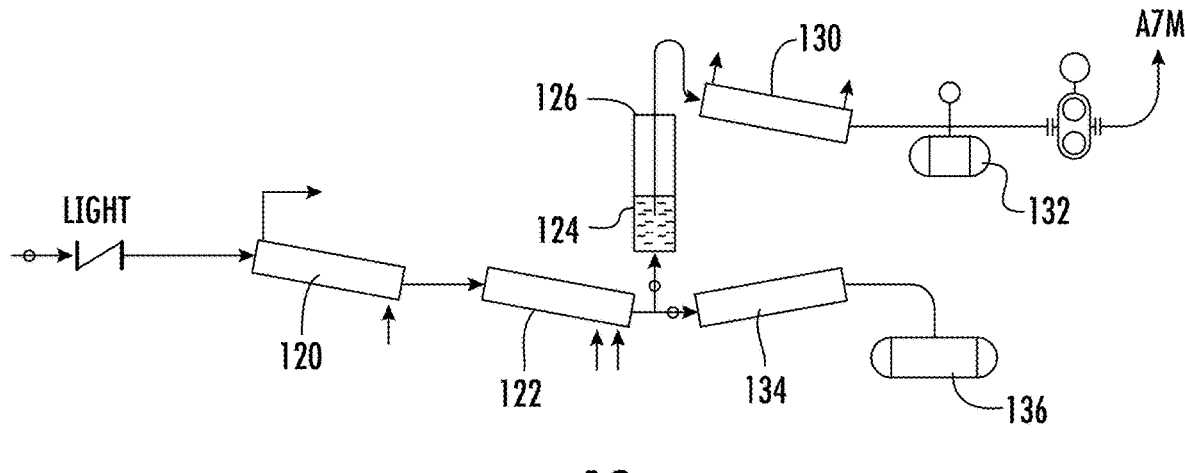
FIG. 13 is a schematic view of light pyrolysis oil processing equipment of the pyrolysis system of FIG. 11.

Referring to FIG. 13, for the processing of light pyrolysis oil, the vapor and NCGs are passed through a pyrolysis vapor cooler 120 before the pyrolysis vapors are condensed in a condenser 122. After the condenser, the NCGs are removed through a demister 124 and gas separator 126. Brine created by the separation is passed through a brine cooler 130. The NCGs are vented off and the brine is stored in a brine tank 132. The condensed pyrolysis vapor is then routed through a second cooler 134 before being stored in a tank 136.

Figure 14:
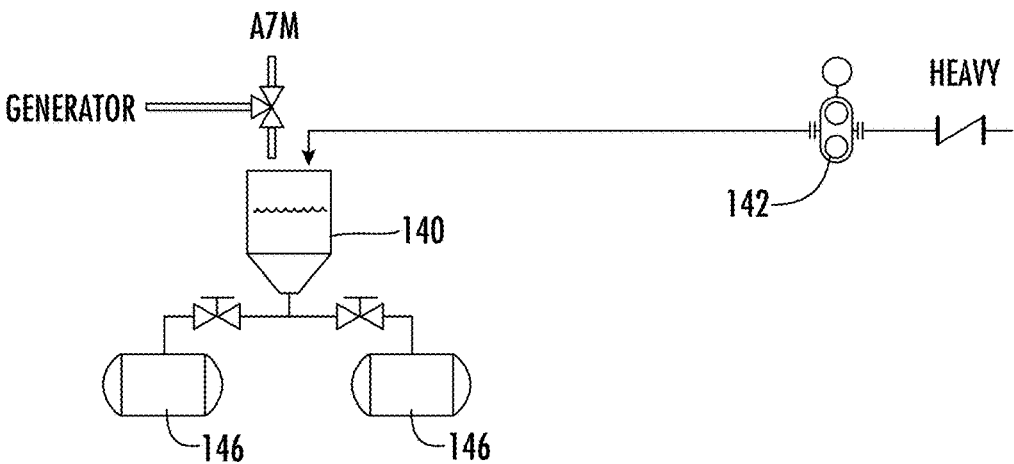
FIG. 14 is a schematic view of heavy pyrolysis oil processing equipment of the pyrolysis system of FIG. 11.

Referring to FIG. 14, for the processing of heavy pyrolysis oil, the pyrolysis vapor and NCGs are forced into a quench tank 140 by a blower 142. The heavy pyrolysis oil sinks to the bottom of the quench tank 144, from whence it is collected in one or more storage tanks 146. The NCGs are either vented or burned to produce energy.

The toroidal pyrolysis chamber arrangement 10 disclosed in FIGS. 1-14 operates as a pyrolysis system for biomass. It includes a biomass flow restriction at the joinder of its solid feed system 22, which operates as a biomass feed extruder, in-line with the pyrolysis chamber 12. The configuration as described above allows segmented toroids to be fed as biomass through the pyrolysis chamber 12 and pyrolyzed. The auger and ram assembly 34 is operable to translate the screw-type auger 36 back and forth along the chamber axis of the sold feed system 22, and together with the constriction, helps prevent flow of vapors from the pyrolysis zone within the pyrolysis chamber 12 back into the green biomass contained in feed bins and in the solid feed system 22.

If the biomass has excess moisture, the system 10 may plug. If there is dry biomass, on the other hand, an acceptable toroid is formed. If the biomass is too dry, there may be difficulty forming the toroids. It is also difficult to "tune" the pyrolysis chamber arrangement 10 for pyrolyzing the biomass based on the size of the biomass particles and percentage of biomass moisture. Both factors should be controlled. Because the solid feed system 22 as a biomass feed extruder and the pyrolysis auger exert a large pressure on the biomass, i.e., sometimes up to thousands of pounds of force, this large force may be taken into account to improve operation of the pyrolysis system.

Figure 17:
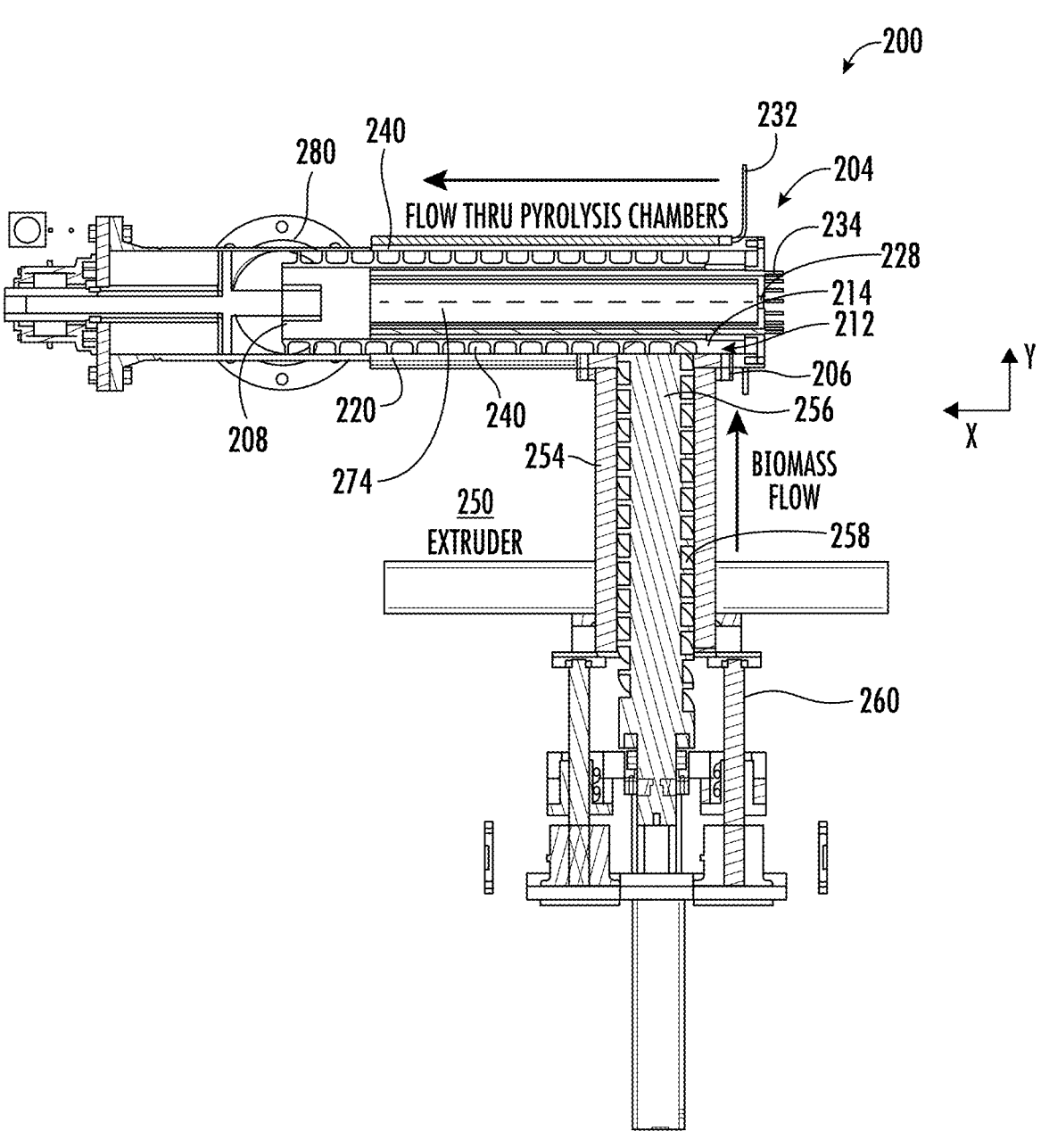
FIG. 17 is a sectional view taken along line 17-17 of FIG. 16.
Figure 18:
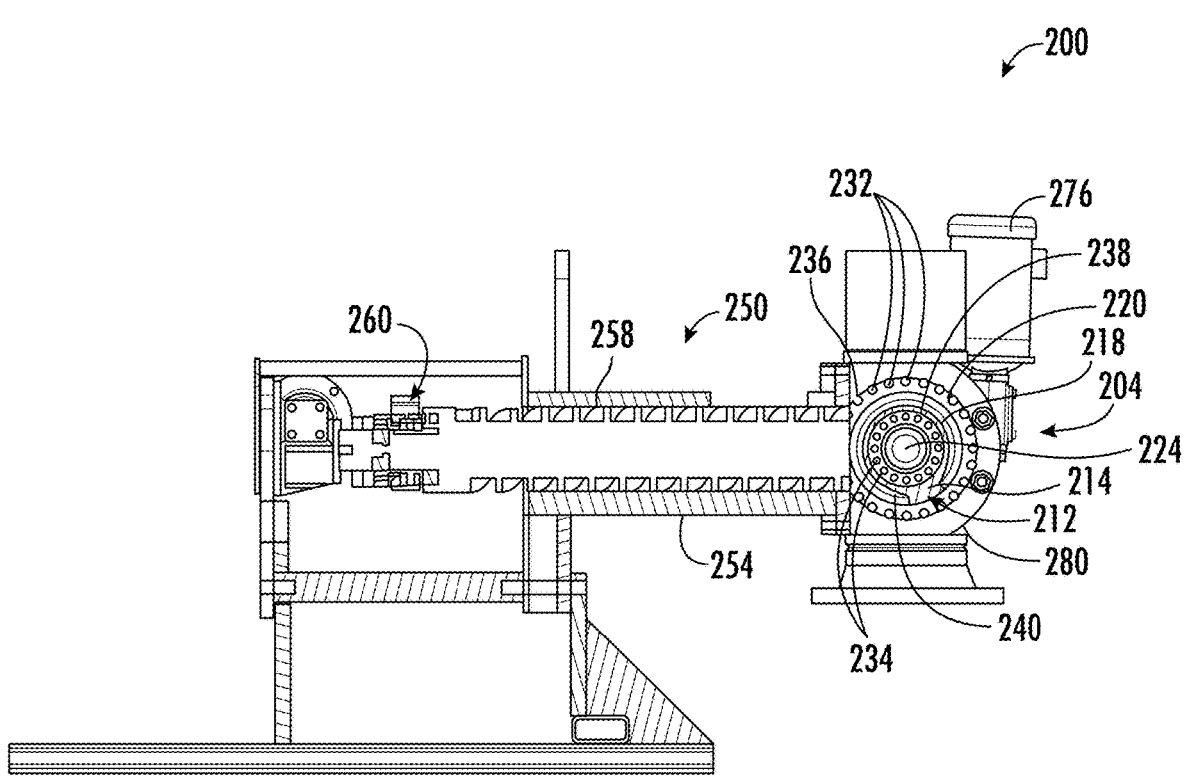
FIG. 18 is a sectional view taken along line 18-18 of FIG. 16.

In accordance with a non-limiting example, the direction of the biomass fed through the solid feed system 22 as the biomass feed extruder relative to the pyrolysis chamber 12 is changed by feeding the biomass orthogonal into the pyrolysis chamber. The biomass flows first in an "Y" direction within the solid feed system, orthogonal to the "X" direction, corresponding to the axis of the pyrolysis chamber (FIG. 17). There is a deceleration of the biomass from the "Y" direction along the axis of the solid feed system as the biomass feed extruder and an acceleration in the "X" direction along the axis of the pyrolysis chamber. This orthogonal biomass feed into the pyrolysis chamber 12 helps create a shearing action, and thus, reduce the sensitivity of the system to the size of the biomass particles and its moisture content. If any particles are too large, then they are sheared, such as during the direction change, which functions similar to a constriction. If the particles are small in diameter, i.e., fine, performance should be minimally affected. In many cases, much of the moisture content can be reduced before pyrolizing. It is preferred to have less than 30% moisture for the biomass, but there still may be some bound moisture and its effect should be minimal.

In the pyrolysis system 200 described relative to FIGS. 15-18, the biomass flows from the biomass feed extruder 250 at an angle of about 90° in a non-limiting example, or generally orthogonal into the primary or main pyrolysis chamber 204. A five fluted auger may move biomass at a few RPMs to restrict the motion of the biomass through the pyrolysis system 200 to enable better resonance time. The change in biomass flow due to the generally orthogonal feed creates a functional constriction and prevents the pyrolysis vapors from back flowing into the biomass delivery system as the biomass feed extruder 250 and any feed hopper in this case. Although about 90° may be a preferred orthogonal angle, it is understood that the direction change may be from about 85° to 95°, or an even larger angle that can vary 5°, 10° or 15° above and below the 90° value depending on the design considerations. Also, the improved pyrolysis system 200 has a concentric heater arrangement formed from inner and outer heater elements that enhance the transfer of thermal energy into the biomass. For description purposes, reference numerals describing the pyrolysis system of FIGS. 15-18 are in the 200 series.

Figure 15:
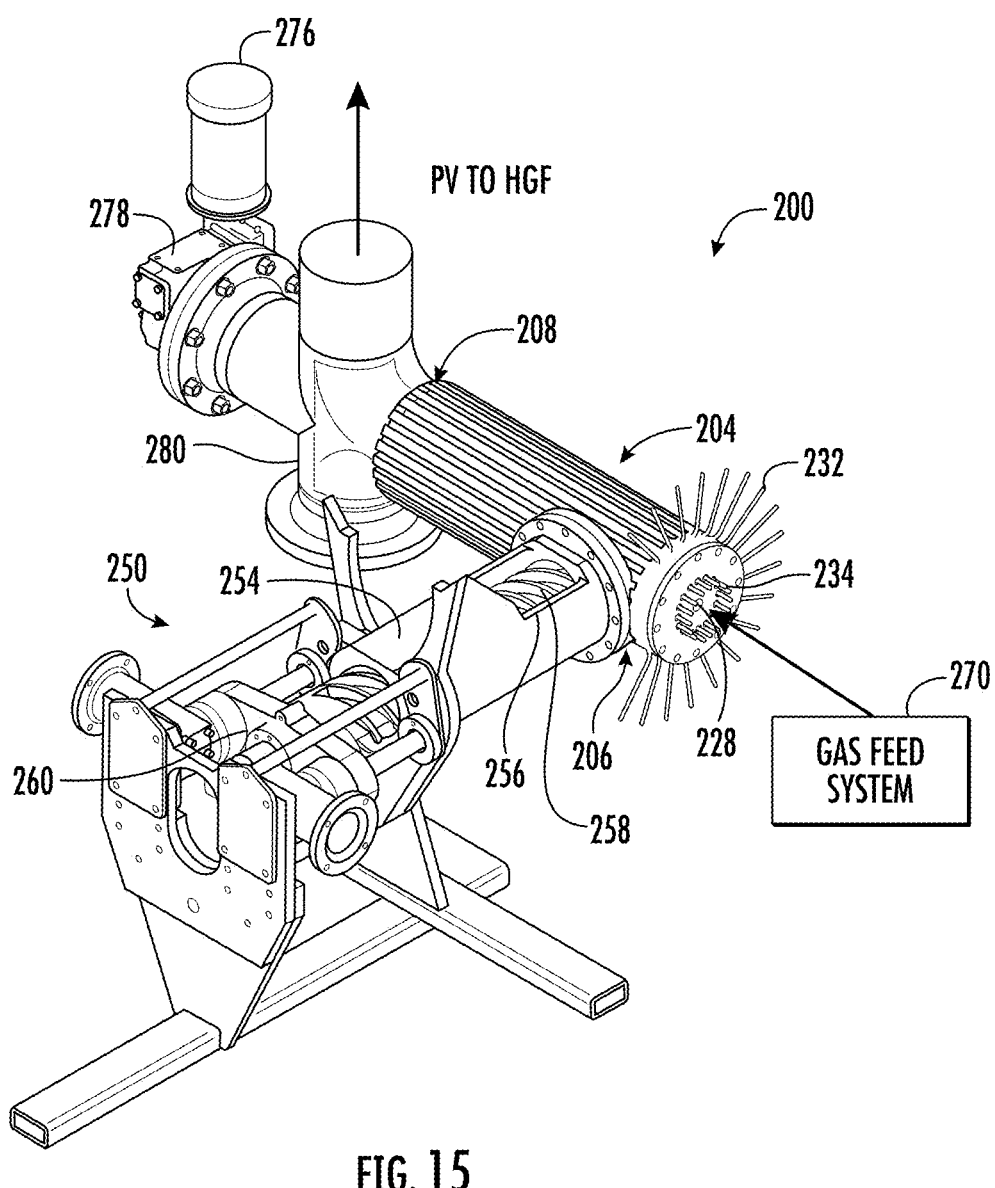
FIG. 15 is an isometric view of the pyrolysis system having a biomass feed extruder advancing biomass orthogonally into the pyrolysis chamber.
Figure 16:
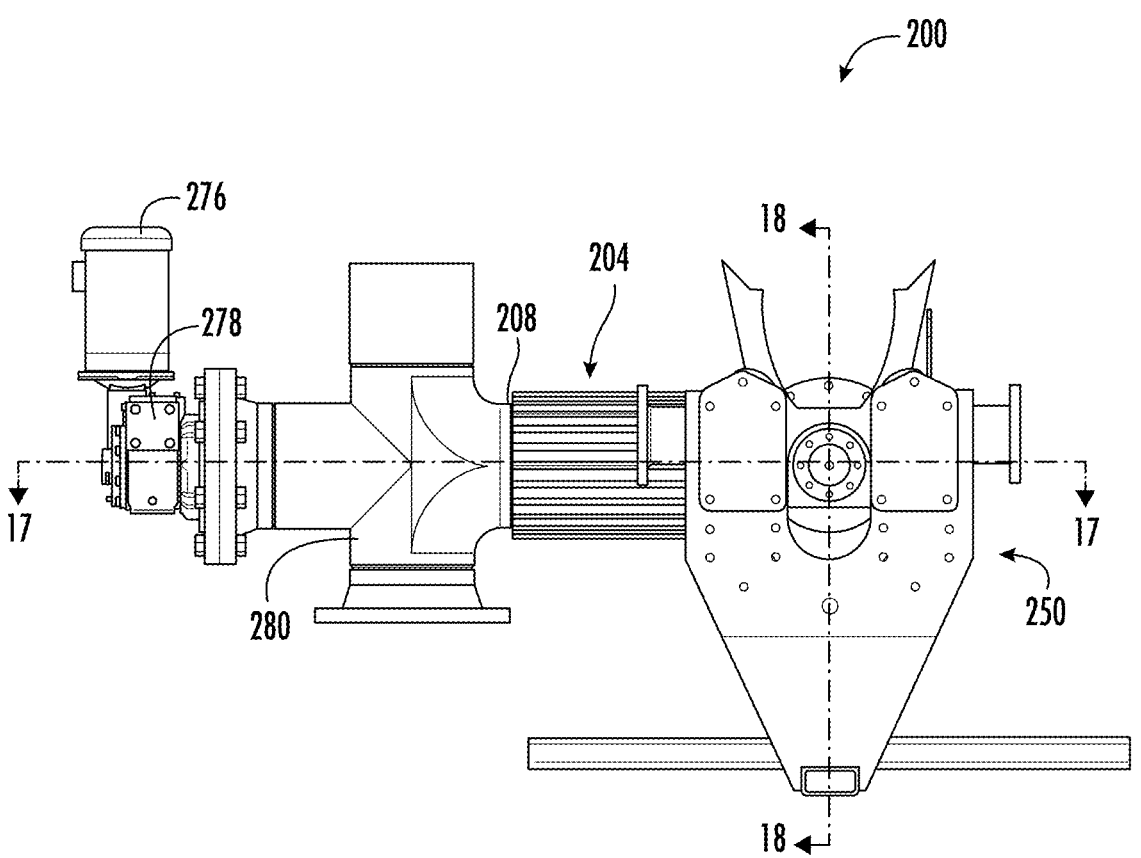
FIG. 16 is a side elevation view of the pyrolysis system of FIG. 15.

The pyrolysis system 200 includes a main or primary pyrolysis chamber 204 having a chamber inlet end 206 and chamber outlet end 208 (FIG. 15). An outer pyrolysis chamber 212 has an outer passage 214 between inner and outer chamber walls 218, 220 as shown in the schematic diagrams of FIGS. 17 and 18, and formed generally concentric to each other. The outer passage 214 extends between the chamber inlet end 206 and chamber outlet end 208 along a chamber axis. An inner pyrolysis chamber 224 has an inner passage 226 radially inward of the inner chamber wall 218 and extends between the chamber inlet end 206 an chamber outlet end 208 along the chamber axis. The inner pyrolysis chamber 224 has an orifice opening in the end of the main pyrolysis chamber 204 at the chamber inlet end 206 defining an inner pyrolysis chamber inlet 228 (FIG. 15).

A plurality of outer heating elements 232 are arranged at the outer chamber wall 220 and located radially outward of the outer passage 214 forming an outer heater. A plurality of inner heating elements 234 are arranged at the inner chamber wall 218 and located radially inward of the outer passage 214 and radially outward of the inner passage 226 and form an inner heater. In an example, the plurality of outer and inner heating elements 232,234 are arranged in heating element passages 236,238 (FIG. 18) formed within the outer and inner chamber walls 218, 220, respectively. These inner and outer heating elements 232,234 may each comprise electrical resistance heating elements, such as described with reference to the pyrolysis system described in FIGS. 1-14, and best shown in the example of FIG. 15 as extending beyond the main pyrolysis chamber 204 to connect to a source of electrical power for resistance heating.

A pyrolysis auger 240 (FIGS. 17 and 18) is operable to advance pyrolyzing biomass within the outer pyrolysis chamber 212 from the chamber inlet end 206 to the chamber outlet end 208. In this example shown in detail in the sectional view of FIG. 18, the inner pyrolysis chamber 224, inner heating elements 234, pyrolysis auger 240, outer pyrolysis chamber 212, and outer heating elements 232 are generally concentric to each other. It is possible that the outer passage 214 may define generally a toroidal passage.

The biomass feed extruder 250 shown in FIGS. 15-18 may be similar in configuration to the solid feed system 22 shown in FIGS. 1-14 as modified for orthogonal feed. The biomass feed extruder 250 includes an auger housing 254 having a housing inlet 256 that receives biomass and a distal end connected to the chamber inlet end 206 of the main pyrolysis chamber 204. A biomass feed auger 258 is arranged within the auger housing 254 and configured to receive biomass at the housing inlet 256 and advance the biomass from the housing inlet through the auger housing generally orthogonally into the outer passage 214 of the outer pyrolysis chamber 212. The biomass feed extruder 250 includes a ram drive system 260 similar to the ram drive and associated components described relative to FIGS. 1-14 and operable to translate the biomass feed auger 258 back and forth to compact the biomass fed into the outer pyrolysis chamber 212. The biomass feed extruder 250 and outer pyrolysis chamber 212 are configured to create a shearing effect on the biomass as it enters the outer pyrolysis chamber from the biomass feed extruder.

Similar to the pyrolysis system arrangement 10 shown in FIGS. 1-14, a gas feed system 270 may be operable to supply a controllable flow of gas to the inner pyrolysis chamber 224 at the chamber inlet end 206 via the inner pyrolysis chamber inlet 228. The biomass feed extruder 250 and the outer pyrolysis chamber 212 are configured to create a change in biomass flow of about 90° from the biomass feed extruder into the outer pyrolysis chamber. This configuration may function similar to a constriction where there is a biofeed deceleration, and then acceleration, to create the shearing action and also help prevent pyrolysis gases from feeding back into the biomass feed extruder 250 and any biofeed hopper or supply.

An inner auger 274 shown by the dashed lines in FIG. 17 may be arranged within the inner pyrolysis chamber 224 and operable to remove deposits therefrom. As shown in FIG. 15, a motor 276 may be mounted to drive the pyrolysis auger 240 via a drive gear mechanism 278. A separate or the same drive motor may be operable to drive the inner auger 274. The incorporation of the substantially concentric inner heating elements 234 and outer heating elements 232 enhances the transfer of thermal energy into the biomass.

The inner heating elements 234 may be configured to heat the pyrolysis auger 240 to a temperature from about 350° C. to 700° C. and above. The outer heating elements 232 may be configured to heat the outer pyrolysis chamber 212 from about 350° C. to 700° C. and above. The inner and outer heating elements 232,234 may each comprise an active region and inactive regions as shown in the pyrolysis system arrangement 210 in FIGS. 1-14.

Similar to the previously described pyrolysis system arrangement 10, the pyrolysis chamber 204 includes a separator 280 that separates ash from pyrolysis vapors, which are then further processed, including by hot gas filtration and other post processing as described above.

Different components may be incorporated into the pyrolysis system 200, its main pyrolysis chamber 204 and its biomass feed extruder 250. The pyrolysis chamber 204 and most of its components may be formed as unitary solid metallic components or ceramic material. A greater number of the outer heating elements 232 may be positioned radially outward than the number of inner heating elements 234. The heating elements 232,234 may have a pair of inactive regions arranged on opposite ends of any active region. The active regions of each of the different portions of heating elements may terminate an equal distance from the chamber outlet end, such as in the example of FIGS. 9A-9C. Other aspects and components as described relative to the pyrolysis system arrangement 10 in FIGS. 1-14 may be included.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A pyrolysis system for biomass, comprising:
a pyrolysis chamber having a chamber inlet end and chamber outlet end, said pyrolysis chamber comprising,
    an outer pyrolysis chamber having inner and outer chamber walls formed generally concentric to each other defining an outer passage as generally a toroidal passage extending between the chamber inlet end and chamber outlet end along a chamber axis,
    an inner pyrolysis chamber having an inner passage radially inward of the inner chamber wall and extending between the chamber inlet and outlet ends along the chamber axis,
    an inner auger arranged within the inner pyrolysis chamber and operable to remove deposits therefrom;
    a plurality of outer heating elements arranged at the outer chamber wall,
    a plurality of inner heating elements arranged at the inner chamber wall, and
    a pyrolysis auger operable to advance pyrolyzing biomass within the outer pyrolysis chamber as the toroidal passage from the chamber inlet end to the chamber outlet end, and wherein the inner pyrolysis chamber, inner heating elements, pyrolysis auger, outer pyrolysis chamber and outer heating elements are generally concentric; and
a biomass feed extruder comprising an auger housing having a housing inlet that receives biomass and a distal end connected to the chamber inlet end, and a biomass feed auger arranged therein and configured to receive biomass at the housing inlet and advance the biomass from the housing inlet through the auger housing generally orthogonally into the outer pyrolysis chamber, wherein the biomass feed extruder includes a ram drive operable to translate the biomass feed auger back and forth to compact the biomass fed into the outer pyrolysis chamber as the toroidal passage, said outer pyrolysis chamber configured as a constriction to cause a biofeed deceleration, and then acceleration, and create a shearing effect on the biomass as it enters the outer pyrolysis chamber as the toroidal passage from the biomass feed extruder, wherein each of the plurality of heating elements has an active region and of equal length, and different portions of the plurality of heating elements have different lengths, the active regions of each of the different portions of heating elements each terminating an equal distance from the chamber outlet end.

2. The pyrolysis system of claim 1, wherein said biomass feed extruder and the outer pyrolysis chamber are configured to create a change in biomass flow of about ninety degrees from the biomass feed extruder into the outer pyrolysis chamber.

3. The pyrolysis system of claim 1, further comprising a gas feed system operable to supply a controllable flow of gas to the inner pyrolysis chamber at the chamber inlet end.

4. The pyrolysis system of claim 1, wherein the plurality of outer and inner heating elements are arranged in heating element passages formed within the outer and inner chamber walls respectively.

5. The pyrolysis system of claim 1, wherein the inner heating elements are configured to heat the pyrolysis auger to a temperature from 350 degrees Celsius to 700 degrees Celsius.

6. The pyrolysis system of claim 1, wherein the outer heating elements are configured to heat the outer pyrolysis chamber from 350 degrees Celsius to 700 degrees Celsius.

7. The pyrolysis system of claim 1, wherein the inner and outer heating elements each comprise electrical resistance heating elements.

8. A pyrolysis system for biomass, comprising:
a pyrolysis chamber having a chamber inlet end and a chamber outlet end comprising,
an outer pyrolysis chamber having inner and outer chamber walls formed generally concentric to each other defining an outer passage as generally a toroidal passage extending between the chamber inlet end and chamber outlet end along a chamber axis,
an inner pyrolysis chamber having an inner passage radially inward of the inner chamber wall and extending between the chamber inlet end and chamber outlet end along the chamber axis,
an inner auger arranged within the inner pyrolysis chamber and operable to remove deposits therefrom;
a plurality of outer heating elements arranged at the outer chamber wall and located radially outward of the outer passage,
a plurality of inner heating elements arranged at the inner chamber wall and located radially inward of the outer passage and radially outward of the inner passage, and
a pyrolysis auger arranged within the outer pyrolysis chamber and operable to advance pyrolyzing biomass from the chamber inlet end to the chamber outlet end, wherein the inner pyrolysis chamber, inner heating elements, pyrolysis auger, outer pyrolysis chamber and outer heating elements are generally concentric;
a biomass feed extruder comprising an auger housing having a housing inlet that receives biomass and a distal end connected to the chamber inlet end, and a biomass feed auger arranged therein and configured to receive biomass at the housing inlet and advance the biomass from the housing inlet through the auger housing generally orthogonally into the outer pyrolysis chamber, said biomass feed extruder further comprising a ram drive operable to translate the biomass feed auger back and forth to compact the biomass fed into the outer pyrolysis chamber, said biomass feed extruder and outer pyrolysis chamber configured to create a shearing effect on the biomass as it enters the outer pyrolysis chamber from the biomass feed extruder; and
a gas feed system operable to supply a controllable flow of gas to the inner pyrolysis chamber at the chamber inlet end, wherein each of the plurality of heating elements has an active region and of equal length, and different portions of the plurality of heating elements have different lengths, the active regions of each of the different portions of heating elements each terminating an equal distance from the chamber outlet end.

9. The pyrolysis system of claim 8, wherein said biomass feed extruder and outer pyrolysis chamber are configured to create a change in biomass flow of about ninety degrees from the biomass feed extruder into the outer pyrolysis chamber.

10. The pyrolysis system of claim 8, wherein the plurality of outer and inner heating elements are arranged in heating element passages formed within the outer and inner chamber walls respectively.

11. The pyrolysis system of claim 8, wherein the inner heating elements are configured to heat the pyrolysis auger to a temperature from 350 degrees Celsius to 700 degrees Celsius.

12. The pyrolysis system of claim 8, wherein the outer heating elements are configured to heat the outer pyrolysis chamber from 350 degrees Celsius to 700 degrees Celsius.

13. The pyrolysis system of claim 8, wherein the inner and outer heating elements each comprise electrical resistance heating elements.

14. A method of operating a pyrolysis system for biomass, the pyrolysis system comprising a pyrolysis chamber having a chamber inlet end and chamber outlet end, the pyrolysis chamber comprising an outer pyrolysis chamber having inner and outer chamber walls formed generally concentric to each other having an outer passage as generally a toroidal passage extending between the chamber inlet end and chamber outlet end along a chamber axis, an inner pyrolysis chamber defining an inner passage radially inward of the inner chamber wall and extending between the chamber inlet end and chamber outlet end along the chamber axis, an inner auger arranged within the inner pyrolysis chamber and operable to remove deposits therefrom, a plurality of outer heating elements arranged at the outer chamber wall, a plurality of inner heating elements arranged at the inner chamber wall, and a pyrolysis auger operable to advance pyrolyzing biomass within the outer pyrolysis chamber as the toroidal passage from the chamber inlet to the outlet, wherein the inner pyrolysis chamber, inner heating elements, pyrolysis auger, outer pyrolysis chamber and outer heating elements are generally concentric, the method comprising,
receiving biomass within a biomass feed extruder that includes an auger housing having a biomass feed auger and a housing inlet that receives the biomass and a distal end connected to the chamber inlet end, and advancing the biomass from the housing inlet through the auger housing generally orthogonally into the outer passage of the outer pyrolysis chamber, wherein the biomass feed extruder includes a ram drive operable to translate the biomass feed auger back and forth to compact the biomass fed into the outer pyrolysis chamber as the toroidal passage, said outer pyrolysis chamber configured as a constriction to cause a biofeed deceleration, and then acceleration, and create a shearing effect on the biomass as it enters the outer pyrolysis chamber as the toroidal passage from the biomass feed extruder, wherein each of the plurality of heating elements has an active region and of equal length, and different portions of the plurality of heating elements have different lengths, the active regions of each of the different portions of heating elements each terminating an equal distance from the chamber outlet end.

15. The method of claim 14, wherein the biomass feed extruder and outer pyrolysis chamber are configured to create a change in biomass flow of about ninety degrees from the biomass feed extruder into the outer pyrolysis chamber extruder.

16. The method of claim 14, further comprising supplying a controllable flow of gas to the inner pyrolysis chamber at the chamber inlet end.

17. The method of claim 14, wherein the plurality of outer and inner heating elements are arranged in heating element passages formed within the outer and inner chamber walls respectively.

18. The method of claim 14, comprising heating the pyrolysis auger to a temperature from 350 degrees Celsius to 700 degrees Celsius.

19. The method of claim 14, comprising heating the outer pyrolysis chamber from 350 degrees Celsius to 700 degrees Celsius.

20. The method of claim 14, wherein the inner and outer heating elements each comprise electrical resistance heating elements.

* * * * *